United States Patent
Zhang et al.

(10) Patent No.: US 12,484,063 B2
(45) Date of Patent: Nov. 25, 2025

(54) METHOD AND DEVICE FOR UPLINK TRANSMISSION

(71) Applicant: Samsung Electronics Co., Ltd., Suwon-si (KR)

(72) Inventors: Sa Zhang, Beijing (CN); Yi Wang, Beijing (CN); Jingxing Fu, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/451,593

(22) Filed: Oct. 20, 2021

(65) Prior Publication Data
US 2022/0124775 A1     Apr. 21, 2022

(30) Foreign Application Priority Data

Oct. 20, 2020   (CN) .......................... 202011127032.X
Nov. 10, 2020   (CN) ........................ 202011250584.X
(Continued)

(51) Int. Cl.
*H04W 72/21*   (2023.01)
*H04L 1/1607*   (2023.01)
(Continued)

(52) U.S. Cl.
CPC .......... *H04W 72/21* (2023.01); *H04L 1/1678* (2013.01); *H04L 5/0055* (2013.01); *H04W 72/044* (2013.01); *H04W 72/1273* (2013.01)

(58) Field of Classification Search
CPC .............. H04W 72/21; H04W 72/044; H04W 72/1273; H04L 1/1678; H04L 5/0055; H04L 5/0044; H04L 5/0091; H04L 1/1854
See application file for complete search history.

(56) References Cited

U.S. PATENT DOCUMENTS

2018/0227104 A1   8/2018  Han et al.
2020/0313809 A1  10/2020  Park et al.
(Continued)

OTHER PUBLICATIONS

International Search Report and Written Opinion of the International Searching Authority in connection with International Application No. PCT/KR2021/014758 issued Jan. 19, 2022, 7 pages.
(Continued)

*Primary Examiner* — Sharmin Chowdhury

(57) ABSTRACT

A communication method and system for converging a 5th-Generation (5G) communication system for supporting higher data rates beyond a 4th-Generation (4G) system with a technology for Internet of Things (IoT) may be applied to intelligent services based on the 5G communication technology and the IoT-related technology, such as smart home, smart building, smart city, smart car, connected car, health care, digital education, smart retail, security and safety services. A method performed by a user equipment (UE) includes: receiving downlink data and/or downlink control signaling from a base station; determining uplink data and/or uplink control signaling, an uplink time unit and/or an uplink physical channel for transmitting the uplink data and/or the uplink control signaling based on the downlink data and/or the downlink control signaling; and transmitting the uplink data and/or uplink control signaling to the base station on the determined uplink time unit and/or uplink physical channel.

16 Claims, 15 Drawing Sheets

(30) Foreign Application Priority Data

Jan. 15, 2021 (CN) .................. 202110055690.0
Jul. 30, 2021 (CN) .................. 202110872881.6

(51) Int. Cl.
| | |
|---|---|
| *H04L 5/00* | (2006.01) |
| *H04W 72/044* | (2023.01) |
| *H04W 72/1273* | (2023.01) |

(56) References Cited

U.S. PATENT DOCUMENTS

| | | | |
|---|---|---|---|
| 2021/0029719 A1* | 1/2021 | Zhou | H04L 5/0055 |
| 2021/0051670 A1* | 2/2021 | Fakoorian | H04W 72/23 |
| 2022/0103307 A1* | 3/2022 | Yang | H04W 72/23 |
| 2022/0104234 A1* | 3/2022 | Yang | H04W 72/0446 |
| 2022/0116153 A1* | 4/2022 | Hosseini | H04L 5/0053 |
| 2022/0150905 A1* | 5/2022 | Shimezawa | H04W 72/23 |
| 2022/0399979 A1* | 12/2022 | Gao | H04L 5/0055 |
| 2023/0112147 A1* | 4/2023 | Chien | H04L 1/1861 370/329 |
| 2023/0269726 A1 | 8/2023 | Li et al. | |
| 2023/0397183 A1 | 12/2023 | Kittichokechai et al. | |

OTHER PUBLICATIONS

CMCC, "Discussion on UE feedback enhancements for HARQ-ACK" 3GPP TSG RAN WG1 #102-e, R1-2006207, e-Meeting, Aug. 17-28, 2020, 3 pages.

LG Electronics, "Discussion on UE feedback enhancement for HARQ-ACK" 3GPP TSG RAN WG1 #102-e, R1-2006314, e-Meeting, Aug. 17-28, 2020, 3 pages.

ZTE, "Discussion on HARQ-ACK enhancements for eURLLC" 3GPP TSG RAN WG1 Meeting #102-e, R1-2005431, e-Meeting, Aug. 17-28, 2020, 6 pages.

Nokia et al., "On the necessity and support of Rel-17 URLLC HARQ-ACK feedback enhancements" 3GPP TSG RAN WG1 Meeting #102-e, R1-2006339, e-Meeting, Aug. 17-28, 2020, 6 pages.

Supplementary European Search Report dated Feb. 15, 2024, in connection with European Patent Application No. 21883259.0, 9 pages.

Notice of Allowance issued Feb. 5, 2024, in connection with Japanese Patent Application No. 2023-524445, 6 pages.

Oppo, "Summary#1 on UCI enhancements for R16 URLLC," 3GPP TSG RAN WG1 #102-e, R1-2006971, e-Meeting, Aug. 2020, 35 pages.

Samsung, "Corrections on CA operation", [Online] May 20, 2018 (May 20, 2018), 3GPP TSG RAN WG1 Meeting #93; R1-806740, Busan, Korea, May 2018, 5 pages.

Non-Final Office Action dated Oct. 9, 2024, in connection with U.S. Appl. No. 18/442,017, 14 pages.

Office Action issued Jan. 7, 2025, in connection with Japanese Patent Application No. 2024-034016, 8 pages.

Huawei et al., "UE feedback enhancements for HARQ-ACK[online]," 3GPP TSG RAN WG1 #102-e, R1-2005243, Aug. 2020, 8 pages.

Xiaomi, "Discussion on remaining issues on UCI enhancement for URLLC[online]," 3GPP TSG RAN WG1 #100_e, R1-2000409, Feb. 24-Mar. 6, 2020, 2 pages.

Office Action issued Sep. 12, 2025, in connection with Vietnamese Patent Application No. 1-2023-02640, 4 pages.

* cited by examiner

METHOD AND DEVICE FOR UPLINK TRANSMISSION

CROSS-REFERENCE TO RELATED APPLICATIONS

This application is based on and claims priority under 35 U.S.C. § 119 to Chinese Patent Application No. 202011127032.X, filed on Oct. 20, 2020, in the Chinese Intellectual Property Office, Chinese Patent Application No. 202011250584.X, filed on Nov. 10, 2020, in the Chinese Intellectual Property Office, Chinese Patent Application No. 202110055690.0, filed on Jan. 15, 2021, in the Chinese Intellectual Property Office, Chinese Patent Application No. 202110872881.6, filed on Jul. 30, 2021, in the Chinese Intellectual Property Office, the disclosure of each of which is incorporated by reference herein in its entirety.

BACKGROUND

1. Field

The disclosure relates to a technical field of wireless communication, in particular to a method and a device for uplink transmission.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Additional aspects will be set forth in part in the description which follows and, in part, will be apparent from the description, or may be learned by practice of the presented embodiments.

According to an aspect of the disclosure, there is provided a method performed by a user equipment (UE) in a wireless communication system, including: receiving downlink data and/or downlink control signaling from a base station; and transmitting uplink data and/or uplink control signaling to the base station based on the downlink data and/or the downlink control signaling received from the base station.

According to another aspect of the disclosure, there is provided a user equipment (UE) in a wireless communication system, including: a transceiver configured to transmit and receive signals; and a controller configured to control the transceiver to: receive downlink data and/or downlink control signaling from a base station; and transmit uplink data and/or uplink control signaling to the base station based on the downlink data and/or the downlink control signaling received from the base station.

According to yet another aspect of the disclosure, there is provided a method performed by a base station in a wireless communication system, including: transmitting downlink data and/or downlink control signaling to a UE; and receiving, from the UE, uplink data and/or uplink control signaling that are transmitted by the UE based on the downlink data and/or the downlink control signaling received from the base station.

According to still another aspect of the disclosure, there is provided a base station in a wireless communication system, including a transceiver configured to transmit and receive signals; and a controller configured to control the transceiver to: transmit downlink data and/or downlink control signaling to a UE; and receive, from the UE, uplink data and/or uplink control signaling that are transmitted by the UE based on the downlink data and/or the downlink control signaling received from the base station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In order to explain the technical schemes of the embodiments of the disclosure more clearly, drawings of the embodiments will be briefly introduced below, Apparently, drawings in the following description only refer to some embodiments of the disclosure, but do not limit the disclosure.

The above and other aspects, features and advantages of certain embodiments of the disclosure will be more apparent from the following detailed description, taken in conjunction with the accompanying drawings, in which.

The same reference numerals are used to represent the same elements throughout the drawings.

DETAILED DESCRIPTION

Figure 1:
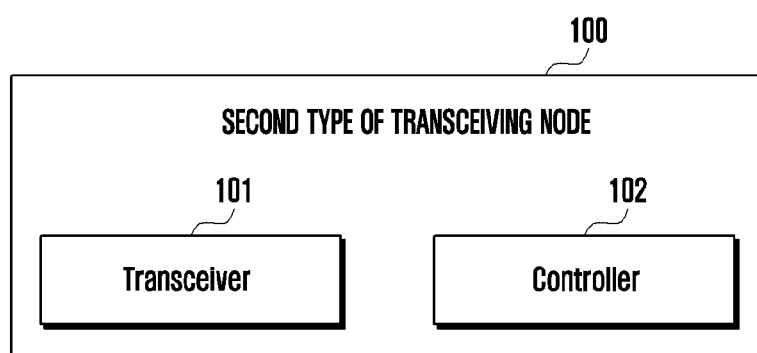
FIG. 1 illustrates a block diagram of the second type of transceiving node according to an embodiment of the disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In order to make the purposes, technical schemes and advantages of the embodiments of the disclosure clearer, the technical schemes of the embodiments of the disclosure will be described clearly and completely with reference to the drawings of the embodiments of the disclosure. Apparently, the described embodiments are some but not all embodiments of the disclosure. Based on the described embodiments of the disclosure, all other embodiments obtained by those of ordinary skill in the art without creative labor belong to the scope of protection of the disclosure.

Unless otherwise defined, the technical terms or scientific terms used in the disclosure shall have the ordinary meaning understood by those with ordinary skills in the art to which the disclosure belongs. Terms "first", "second" and the like used in the disclosure do not mean any order, quantity or importance, but are only used to distinguish different components. Similarly, terms "a", "an" or "the" and the like do not indicate a limitation of quantity, but indicate the existence of at least one of the referenced item. For example, reference to "a component surface" includes reference to one or more of such surfaces. Terms "include" or "contain" and the like mean that elements or objects appearing before the term encompass the listed elements or objects appearing after the term and the equivalents thereof, but not exclude other elements or objects. Words "connected" or "connected with" and the like are not limited to physical or mechanical connection, but may include electrical connection, whether direct or indirect. "Upper", "lower", "left" and "right" are only used to express a relative positional relationship, and when an absolute position of a described object changes, the relative positional relationship may change accordingly.

The disclosure will be explained by several specific examples below. In order to keep the following description of embodiments of the disclosure clear and concise, detailed descriptions of known functions and known components may be omitted. When any component of an embodiment of the disclosure appears in more than one drawing, the component is denoted by the same reference numeral in each drawing.

Terms used herein to describe embodiments of the disclosure are not intended to limit and/or define the scope of the disclosure. For example, unless otherwise defined, the technical terms or scientific terms used in the disclosure shall have the ordinary meaning understood by those with ordinary skills in the art to which the disclosure belongs.

It should be understood that "first", "second" and the like used in the disclosure do not mean any order, quantity or importance, but are only used to distinguish different components. Unless the context clearly indicates otherwise, the singular forms "a", "an" or "the" and the like do not indicate a limitation of quantity, but indicate the existence of at least one.

As used herein, any reference to "one example" or "example", "one embodiment" or "embodiment" means that a particular element, feature, structure or characteristic described in connection with the embodiment is included in at least one embodiment. The phrases "in one embodiment" or "in one example" appearing in different places in the specification do not necessarily refer to the same embodiment.

It should be further understood that the terms "include" or "contain" and the like mean that elements or objects appearing before the term encompass the listed elements or objects appearing after the term and the equivalents thereof, but not exclude other elements or objects. Terms "connected" or "connected with" and the like are not limited to physical or mechanical connection, but may include electrical connection, whether direct or indirect. "Upper", "lower", "left" and "right" are only used to express a relative positional relationship, and when an absolute position of a described object changes, the relative positional relationship may change accordingly.

The various embodiments discussed below for describing the principles of the disclosure in this patent document are for illustration only and should not be interpreted as limiting the scope of the disclosure in any way. Those skilled in the art will understand that the principles of the disclosure may be implemented in any suitably arranged wireless communication system. For example, although the following detailed description of the embodiments of the disclosure will be directed to LTE and 5G, those skilled in the art can understand that with slight modifications, main gist of the disclosure may also be applied to other communication systems with similar technical backgrounds and channel formats without departing from the scope of the disclosure.

As can be understood by those skilled in the art, "terminal" and "terminal device" as used herein include not only a device serving as a wireless signal receiver which has no transmitting capability, but also a hardware device for receiving and transmitting, which has a capability of receiving and transmitting in bidirectional communication on a bidirectional communication link. Such devices may include a cellular or other communication device with a single-line display or a multi-line display or a cellular or other communication device without a multi-line display; a PCS (personal communication system), which is capable of combining voice, data processing, fax and/or data communication; a PDA (personal digital assistant), which may include a radio frequency receiver, pager, internet/intranet access, web browser, notepad, calendar and/or GPS (global positioning system) receiver; a conventional laptop and/or palmtop or other device having and/or including a radio frequency receiver. As used herein, "terminal" and "terminal device" may be portable, transportable, installed in vehicles (aviation, sea transportation and/or land), or suitable and/or configured to run locally, and/or in distributed form, running at any other position on the earth and/or space. As used herein, "terminal" and "terminal device" may also be a communication terminal, an internet terminal and a music/video playing terminal, such as a PDA, a MID (mobile internet device) and/or a mobile phone with a music/video playing function, as well as a smart TV, a set-top box and other devices.

With the rapid development of information industry, especially the increasing demand from mobile Internet and internet of things (IoT), unprecedented challenges are brought to the future mobile communication technology. According to a report of International Telecommunication Union (ITU), ITU-R M.[IMT.BEYOND 2020.TRAFFIC], it can be predicted that by 2020, the growth of mobile traffic will be nearly 1000 times compared with that in 2010 (4G era), and the number of UE connections will also exceed 17 billion. With massive IoT devices gradually infiltrating into the mobile communication network, the number of connected devices will be even more alarming. In order to meet these unprecedented challenges, the communication industry and academia have launched extensive research on the fifth generation (5G) mobile communication technology to face the 2020s. At present, framework and overall goals of the future 5G has already been discussed in ITU report ITU-R M.[IMT.VISION], in which the demand outlook, use cases and various important performance indicators of 5G are described in detail. With respect to the new demands in 5G, ITU report ITU-R M. [IMT.FUTURE TECHNOLOGY TRENDS] provides information related to trends of 5G technology, aiming at solving significant problems such as significantly improved system throughput, consistent user experience, scalability to support IoT, latency, energy efficiency, cost, network flexibility, support of emerging services and flexible spectrum utilization. In 3GPP (3rd Generation Partnership Project), the first phase of 5G is already in progress. To support more flexible scheduling, 3GPP decides to support variable Hybrid Automatic Repeat Request-Acknowledgement (HARQ-ACK) transmission time in 5G. In an existing Long Term Evolution (LTE) system, the time from the reception of downlink data to the uplink transmission of HARQ-ACK is fixed. For example, in a Frequency Division Duplex (FDD) system, the latency is 4 subframes, and in a Time Division Duplex (TDD) system, a HARQ-ACK transmission time is determined for the corresponding downlink subframe according to uplink and downlink configuration. In a 5G system, whether FDD or TDD, for a certain downlink time unit (for example, a downlink slot or a downlink mini-slot), the uplink time unit available for transmitting HARQ-ACK is variable. For example, the transmission time of HARQ-ACK may be dynamically indicated by physical layer signaling, and different HARQ-ACK latencies may be determined according to factors such as different services or user capabilities.

3GPP has defined three directions of 5G use cases: eMBB (enhanced mobile broadband), mMTC (massive machine-type communications) and URLLC (ultra-reliable and low-latency communications). The eMBB scenario aims to further improve the data transmission rate on the basis of the existing mobile broadband service scenario, so as to enhance user experience and pursue ultimate communication experience between human and human. mMTC and URLLC are use cases of the Internet of Things, but their respective emphases are different: mMTC is mainly the information interaction between humans and things, while URLLC mainly reflects communication needs between things and things.

In 5G, eMBB and URLLC will adopt a non-standalone model, that is, both URLLC services and eMBB services are supported in the same cell. Since URLLC services may be sparse services, compared with URLLC with a standalone model, eMBB and URLLC with a non-standalone model can improve the spectrum efficiency of the system. When there are URLLC services in the system, it is preferred to schedule URLLC services, and when there are no URLLC services in the system or the resources occupied by URLLC services are less, eMBB services can be scheduled. At present, when there is a conflict between URLLC services and eMBB services, data and/or control information of URLLC services will be preferentially transmitted, thus losing performance of eMBB services. Therefore, how to optimize the transmission of data and control information of services (e.g., eMBB services) is a problem to be solved urgently.

To at least solve the above problems, embodiments of the disclosure provide a method for transmitting and receiving signals in a wireless communication system, a terminal, a base station and a non-transitory computer-readable storage medium. Hereinafter, various embodiments of the disclosure will be described in detail with reference to the accompanying drawings.

Hereinafter, embodiments of the disclosure will be described in detail with reference to the accompanying drawings. It should be noted that the same reference numerals in different drawings will be used to refer to the same elements described.

In embodiments of the disclosure, the first type of transceiving node may be a base station, and the second type of transceiving node may be a UE. In the following examples, the base station is taken as an example (but not limited thereto) to illustrate the first type of transceiving node, and the UE is taken as an example (but not limited thereto) to illustrate the second type of transceiving nodes.

FIG. 1 illustrates a block diagram of the second type of transceiving node according to an embodiment of the disclosure.

Referring to FIG. 1, the second type of transceiving node 100 may include a transceiver 101 and a controller 102.

The transceiver 101 may be configured to receive a first type of data and/or a first type of control signaling from the first type of transceiving node and transmit a second type of data and/or a second type of control signaling to the first type of transceiving node in a determined time unit.

The controller 102 may be an application specific integrated circuit or at least one processor. The controller 102 may be configured to control the overall operation of the second type of transceiving node, and to control the second type of transceiving node to implement the methods proposed in embodiments of the disclosure. For example, the controller 102 may be configured to determine the second type of data and/or the second type of control signaling and a time unit for transmitting the second type of data and/or the second type of control signaling based on the first type of data and/or the first type of control signaling, and control the transceiver 101 to transmit the second type of data and/or the second type of control signaling to the first type of transceiving node in the determined time unit.

In some implementations, the first type of data may be data transmitted by the first type of transceiving node to the second type of transceiving node. In the following examples, downlink data carried by a PDSCH (Physical Downlink Shared Channel) is taken as an example (but not limited thereto) to illustrate the first type of data.

In some implementations, the second type of data may be data transmitted by the second type of transceiving node to the first type of transceiving node. In the following examples, uplink data carried by a PUSCH (Physical Uplink Shared Channel) is taken as an example (but not limited thereto) to illustrate the second type of data.

In some implementations, the first type of control signaling may be control signaling transmitted by the first type of transceiving node to the second type of transceiving node. In the following examples, downlink control signaling is taken as an example (but not limited thereto) to illustrate the first type of control signaling. For example, the downlink control signaling may be DCI (Downlink Control Information) carried by a PDCCH (Physical Downlink Control Channel) and/or control signaling carried by a PDSCH (Physical Downlink Shared Channel), e.g., higher layer control signaling carried by the PDSCH.

In some implementations, the second type of control signaling may be control signaling transmitted by the second type of transceiving node to the first type of transceiving node. In the following examples, uplink control signaling is taken as an example (but not limited thereto) to illustrate the second type of control signaling. For example, the uplink control signaling may be UCI (Uplink Control Information) carried by a PUCCH (Physical Uplink Control Channel) and/or control signaling carried by a PUSCH (Physical Uplink Shared Channel). Types of UCI may include HARQ-ACK information, SR (Scheduling Request), LRR (Link Recovery Request) and CSI (Chanel State Information).

In some implementations, the first type of time unit is a time unit for the first type of transceiving node to transmit the first type of data and/or the first type of control signaling. In the following examples, a downlink time unit is taken as an example (but not limited thereto) to illustrate the first type of time unit.

In some implementations, the second type of time unit is a time unit for the second type of transceiving node to transmit the second type of data and/or the second type of control signaling. In the following examples, an uplink time unit is taken as an example (but not limited thereto) to illustrate the second type of time unit.

In some implementations, the first type of time unit and the second type of time unit may be one or more slots, and/or one or more sub-slot, and/or one or more OFDM (Orthogonal Frequency Division Multiplexing) symbols, and/or one or more subframes, and/or one or more spans.

Depending on the network type, the term "base station" or "BS" may refer to any component (or set of components) configured to provide wireless access to the network, such as a transmission point (TP), a transmission-reception point (TRP), an enhanced base station (eNodeB or eNB), a 5G base station (gNB), a macro cell, a femtocell, a WiFi access point (AP) or other wireless-enabled devices. The base station may provide wireless access according to one or more wireless communication protocols, such as 5G 3GPP New Radio (NR) Interface/Access, Long Term Evolution (LTE), LTE-Advanced (LTE-A), High Speed Packet Access (HSPA), Wi-Fi 802.11a/b/g/n/ac, etc. For convenience, the terms "BS" and "TRP" are used interchangeably in this patent document to refer to network infrastructure components that provide wireless access to remote terminals. Furthermore, depending on the network type, the terms "user equipment" or "UE" may refer to any of the following, such as "mobile station", "subscriber station", "remote terminal", "wireless terminal", "receiving point", "user device"

or simply "terminal". For convenience, the term "user equipment" or "UE" is used in this patent document to refer to a remote wireless device that wirelessly accesses the BS, whether the UE is a mobile device (such as a mobile phone or a smart phone) or a fixed device that is generally considered (for example, a desktop or a vending machine).

Figure 2:
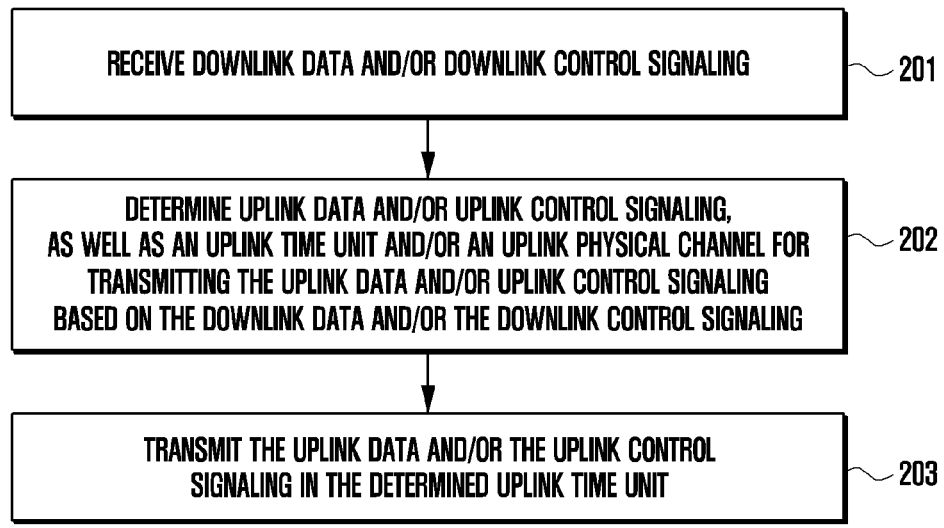
FIG. 2 illustrates a flowchart of a method performed by a UE according to an embodiment of the disclosure.

FIG. 2 illustrates a flowchart of a method performed by a UE according to an embodiment of the disclosure.

For convenience of description, a cycle process including steps 201 to 203 shown in FIG. 2 is defined as a downlink-uplink transmission process.

Referring to FIG. 2, in step 201, a UE receives downlink data and/or downlink control signaling from a base station.

In step 202, the UE determines uplink data and/or uplink control signaling as well as an uplink time unit and/or an uplink physical channel for transmitting the uplink data and/or uplink control signaling, based on the downlink data and/or the downlink control signaling.

In step 203, the UE transmits the uplink data and/or the uplink control signaling to the base station in the determined uplink time unit.

In some implementations, the UE may perform multiple downlink-uplink transmission processes, and each of the multiple downlink-uplink transmission processes includes step 201, step 202, and step 203. Different downlink-uplink transmission processes may be independent or interrelated.

In some implementations, the downlink control signaling may include DCI carried by a PDCCH and/or control signaling carried by a PDSCH. For example, the DCI may be used to schedule transmission of a PUSCH or reception of a PDSCH. Some examples of uplink transmission timing will be described below with reference to FIGS. 5A-5C.

Figure 5A:
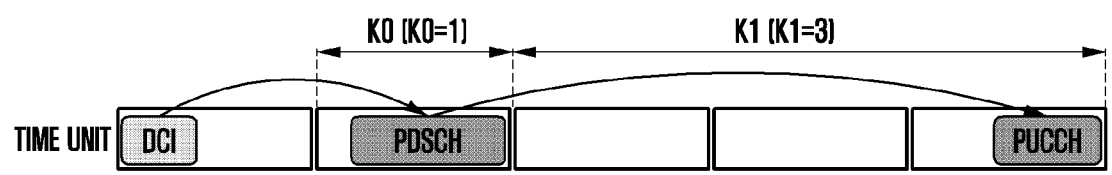
FIG. 5A illustrates an example of uplink transmission timing according to an embodiment of the disclosure.

In an example, the UE receives the DCI, and receives the PDSCH according to time domain resources indicated in the DCI. For example, a parameter K0 may be used to indicate a time interval between the PDSCH scheduled by the DCI and the PDCCH carrying the DCI, and K0 may be in units of slots. For example, FIG. 5A gives an example of K0=1. In the example shown in FIG. 5A, the time interval from the PDSCH scheduled by the DCI to the PDCCH carrying the DCI is 1 slot.

Figure 5B:
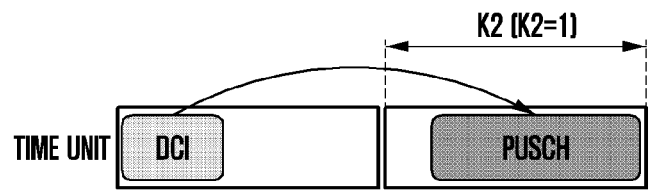
FIG. 5B illustrates an example of uplink transmission timing according to an embodiment of the disclosure.

In another example, the UE receives the DCI and transmits the PUSCH according to time domain resources indicated in the DCI. For example, a parameter K2 may be used to indicate a time interval between the PUSCH scheduled by the DCI and the PDCCH carrying the DCI, and K2 may be in units of slots. For example, FIG. 5B gives an example of K2=1. In the example shown in FIG. 5B, the time interval between the PUSCH scheduled by the DCI and the PDCCH carrying the DCI is 1 slot.

In yet another example, the UE receives the PDSCH, and may transmit HARQ-ACK information for the PDSCH in a PUCCH in an uplink time unit. For example, a parameter K1 may be used to indicate a time interval between the PUCCH for transmitting the HARQ-ACK information for the PDSCH and the PDSCH, and K1 may be in units of uplink time units, such as slots or sub-slots. For example, FIG. 5A gives an example of K1=3. In the example shown in FIG. 5A, the time interval between the PUCCH for transmitting the HARQ-ACK information for the PDSCH and the PDSCH is 3 slots.

Figure 5C:
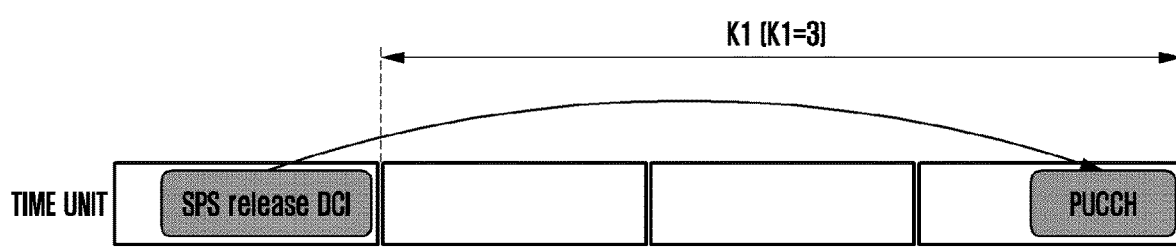
FIG. 5C illustrates an example of uplink transmission timing according to an embodiment of the disclosure.

In yet another example, the UE receives the DCI (e.g., DCI indicating SPS (Semi-Persistent Scheduling) release), and may transmit the HARQ-ACK information for the DCI on the PUCCH in an uplink time unit. For example, a parameter K1 may be used to indicate a time interval between the PUCCH for transmitting the HARQ-ACK information for the DCI and the DCI, and K1 may be in units of uplink time units, such as slots or sub-slots. For example, FIG. 5C gives an example of K1=3. In the example of FIG. 5C, the time interval between the PUCCH for transmitting the HARQ-ACK information for the DCI and the DCI is 3 slots. For example, the parameter K1 may be used to indicate a time interval between an SPS PDSCH reception and the PUCCH feeding back the HARQ-ACK therefor, where K1 is indicated in the DCI for activating the SPS PDSCH. In some implementations, in step S520, the UE may report (or transmit) a UE capability to the base station. For example, the UE reports (or transmits) the UE capability to the base station by transmitting the PUSCH. In this case, the PUSCH transmitted by the UE includes UE capability information.

In some implementations, the base station may configure higher layer signaling for the UE according to the UE capability previously received from the UE (e.g., in step 202 in the previous downlink-uplink transmission process). For example, the base station configures higher layer signaling for the UE by transmitting a PDSCH. In this case, the PDSCH transmitted by the base station includes higher layer signaling configured for the UE. It should be noted that the higher layer signaling is higher layer signaling compared with physical layer signaling. For example, the higher layer signaling may include RRC (Radio Resource Control) signaling and/or a MAC (Media Access Control) CE (Control Element).

In some implementations, the UE may be configured with two levels of priorities for uplink transmission. For example, the two levels of priorities may include the first priority and the second priority which are different from each other. In an example, the first priority may be higher than the second priority. In another example, the first priority may be lower than the second priority. However, embodiments of the disclosure are not limited thereto, for example, the UE may be configured with more than two levels of priorities. For the sake of convenience, in embodiments of the disclosure, description is made under the consideration of that the first priority is higher than the second priority. It should be noted that all embodiments of the disclosure are applicable to the case where the first priority may be higher than the second priority; all embodiments of the disclosure are applicable to the case where the first priority may be lower than the second priority; and all embodiments of the disclosure are applicable to the case where the first priority may be equal to the second priority.

In an example, the two levels of priorities may be indicated by priority numbers or priority indexes (e.g., priority index 1 and priority index 0). For example, a larger priority index may correspond to a higher priority, that is, a priority corresponding to priority index 1 may be higher than a priority corresponding to priority index 0. In this case, the larger priority index (e.g., priority index 1) may be the higher priority (e.g., the first priority), and the smaller priority index (e.g., priority index 0) may be a lower priority (e.g., the second priority). However, embodiments of the disclosure are not limited thereto, for example, other priority indexes or indicators may be used to indicate the two levels of priorities. For the sake of convenience, in embodiments of the disclosure, description is made under the consideration of that the priority corresponding to the larger priority index (e.g., priority index 1) is higher than that corresponding to a smaller priority index (e.g., priority index 0). In addition, in the embodiments of the disclosure, priority index 1 may be used interchangeably with the first priority, the larger priority index or the higher priority, and priority index 0 may be used interchangeably with the second priority, the smaller priority index or the lower priority.

In some implementations, the two levels of priorities configured for the UE may be two physical layer priorities. For example, one of the two levels of priorities (the first priority (e.g., priority index 1) or the second priority (e.g., priority index 0)) may be provided for a PUSCH or a PUCCH. Specifically, a PUSCH or PUCCH transmission (including a repetition transmission if there is the repetition transmission) may have (for example, correspond to) the priority index 0 or the larger priority index (for example, priority index 1).

In some implementations, the first priority or the higher priority (e.g., the larger priority index (e.g., priority index 1)) may correspond to a first service (e.g., URLLC service), and the second priority or the lower priority (e.g., the smaller priority index (e.g., priority index 0)) may correspond to a second service (e.g., eMBB service). In an example, with respect to a scheduling-free PUSCH transmission, the UE may determine a priority index according to a priority parameter (e.g., the parameter of priority) (if configured). With respect to a PUCCH transmission with the HARQ-ACK information corresponding to an SPS PDSCH reception or an SPS PDSCH release, the UE may determine the priority index of the PUCCH transmission from the HARQ-ACK codebook priority parameter and/or the HARQ-ACK codebook index parameter (e.g., the parameter of HARQ-CodebookID) (if configured).

In an example, if the priority is not configured or indicated for a PUSCH or a PUCCH transmission of the UE, the priority index of the PUSCH or the PUCCH transmission may be 0.

In an example, if the UE monitors a PDCCH in an active DL BWP (Bandwidth Part) to detect DCI format 0_1 and DCI format 1_1 or to detect DCI format 0_2 and DCI format 1_2, the priority index may be provided through a priority indication field. If the UE indicates that it has the capability to monitor the PDCCH in the active DL BWP to detect DCI format 0_1 and DCI format 1_1, and to detect DCI format 0_2 and DCI format 1_2, DCI format 0_1 or DCI format 0_2 may schedule a PUSCH transmission with any priority, and DCI format 1_1 or DCI format 1_2 may schedule a PDSCH reception and trigger a PUCCH transmission for corresponding HARQ-ACK information with any priority.

In an example, the UE may be configured with a PUCCH configuration list parameter (e.g., the parameter of PUCCH-ConfigurationList), which may include two PUCCH configuration parameters (e.g., the parameter of PUCCH-config), including the first PUCCH configuration parameter and the second PUCCH configuration parameter. For example, the first PUCCH configuration parameter may correspond to the second priority (e.g., the smaller priority index (e.g., priority index 0)), that is, the priority of the first PUCCH configuration parameter may be the second priority (e.g., the smaller priority index (e.g., priority index 0)). Also, the second PUCCH configuration parameter may correspond to the first priority (e.g., the larger priority index (e.g., priority index 1)), and the priority of the second PUCCH configuration parameter may be the first priority (e.g., the larger priority index (e.g., priority index 1)).

For example, a sub-slot length parameter (e.g., the parameter of subslotLengthForPUCCH) of each of the first and second PUCCH configuration parameters may be 7 OFDM symbols, or 6 OFDM symbols, or 2 OFDM symbols. Sub-slot configuration length parameters in different PUCCH configuration parameters may be configured separately. If no sub-slot length parameter is configured in a PUCCH configuration parameter, the scheduling time unit of this PUCCH configuration parameter is one slot by default. If a sub-slot length parameter is configured in the PUCCH configuration parameter, the scheduling time unit of this PUCCH configuration parameter is a number of OFDM symbols of which the number is the configured sub-slot configuration length (e.g., subslotLengthForPUCCH OFDM symbols).

In some implementations, the UE may be configured with a PDSCH HARQ-ACK codebook list parameter (e.g., the parameter of pdsch-HARQ-ACK-CodebookList). For example, the PDSCH HARQ-ACK codebook list parameter may include two PDSCH HARQ-ACK codebook configuration parameters (e.g., the parameter of pdsch-HARQ-ACK-Codebook), including the first PDSCH HARQ-ACK codebook configuration parameter and the second PDSCH HARQ-ACK codebook configuration parameter. For example, the first PDSCH HARQ-ACK codebook configuration parameter corresponds to the first HARQ-ACK codebook configuration, where the first HARQ-ACK codebook is associated with a PUCCH with the smaller priority index (e.g., priority index 0), and the second PDSCH HARQ-ACK codebook configuration parameter corresponds to a second HARQ-ACK codebook configuration, where the second HARQ-ACK codebook is associated with a PUCCH with the larger priority index (e.g., priority index 1). In this case, the priority of the first HARQ-ACK codebook may be the second priority (e.g., the smaller priority index (e.g., priority index 0)), and the priority of the second HARQ-ACK codebook may be the first priority (e.g., the larger priority index (e.g., priority index 1)). For example, the UE may determine to generate a semi-static HARQ-ACK codebook (e.g., the Type-1 HARQ-ACK codebook in 3GPP), a dynamic HARQ-ACK codebook (e.g., the Type-2 HARQ-ACK codebook in 3GPP) or an enhanced dynamic HARQ-ACK codebook (e.g., the Type-2 HARQ-ACK codebook based on grouping and HARQ-ACK retransmission in 3GPP) according to the PDSCH HARQ-ACK codebook configuration parameter.

A HARQ-ACK codebook may include HARQ-ACK information for one or more PDSCHs and/or DCIs. If HARQ-ACK information for one or more PDSCHs and/or DCIs is transmitted in the same uplink time unit, the UE generates a HARQ-ACK codebook according to a pre-defined rule. For example, the UE generates the HARQ-ACK codebook according to a pseudo code specified in protocols. For example, the UE receives a DCI format indicating SPS deactivation, and the UE transmits the HARQ-ACK information for this DCI format. For example, the UE receives a DCI format indicating that a secondary cell is dormant, and the UE transmits the HARQ-ACK information for this DCI format. For example, the UE receives a DCI format indicating to transmit the HARQ-ACK information for all the HARQ-ACK processes (for example, a one shot HARQ-ACK codebook; for another example, a Type-3 HARQ-ACK codebook in 3GPP TS 38.213), and the UE transmits the HARQ-ACK information for all the HARQ-ACK processes. For example, the UE receives a DCI format scheduling a PDSCH, and the UE transmits the HARQ-ACK information for this PDSCH. For example, the UE receives an SPS PDSCH, and the UE transmits the HARQ-ACK information for this PDSCH. For example, the UE is configured by higher layer signaling to receive an SPS PDSCH, and the UE transmits the HARQ-ACK information for this PDSCH. If the UE is configured by higher layer signaling to receive an SPS PDSCH, this SPS PDSCH may be cancelled by other signaling. For example, the UE is configured by higher layer signaling that an uplink symbol (e.g., an OFDM symbol) in a semi-static frame structure overlaps with a symbol of this SPS PDSCH, and the UE does not receive this SPS PDSCH. For example, the UE is configured by higher layer signaling to receive an SPS PDSCH according to a predefined rule, and the UE transmits the HARQ-ACK information for this PDSCH.

Figure 3:
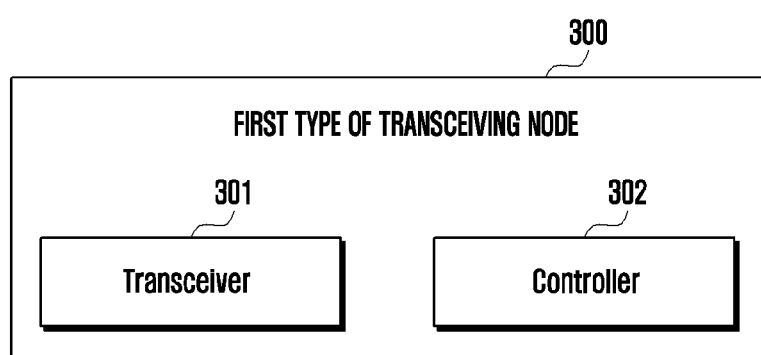
FIG. 3 illustrates a block diagram of the first type of transceiving node according to an embodiment of the disclosure.

FIG. 3 illustrates a block diagram of the first type of transceiving node according to an embodiment of the disclosure.

Referring to FIG. 3, the first type of transceiving node 300 may include a transceiver 301 and a controller 302.

The transceiver 301 may be configured to transmit the first type of data and/or the first type of control signaling to the second type of transceiving node and receive the second type of data and/or the second type of control signaling from the second type of transceiving node in a time unit.

The controller 302 may be an application specific integrated circuit or at least one processor. The controller 102 may be configured to control the overall operation of the first type of transceiving node, including controlling the transceiver 301 to transmit the first type of data and/or the first type of control signaling to the second type of transceiving node and receive the second type of data and/or the second type of control signaling from the second type of transceiving node in a determined time unit, in which the second type of data and/or the second type of control signaling and the time unit is determined by the second type of transceiving node based on the received first type of data and/or first type of control signaling.

In the following description, a base station is taken as an example (but not limited thereto) to illustrate the first type of transceiving node, a UE is taken as an example (but not limited thereto) to illustrate the second type of transceiving node, the first type of time unit is illustrated by a downlink time unit (but not limited thereto), and the time unit is illustrated by an uplink time unit (but not limited thereto). The first type of data and/or the first type of control signaling is illustrated by downlink data and/or downlink control signaling (but not limited thereto). A HARQ-ACK codebook may be included in the second type of control signaling, and the second type of control signaling is illustrated by uplink control signaling (but not limited thereto).

Figure 4:
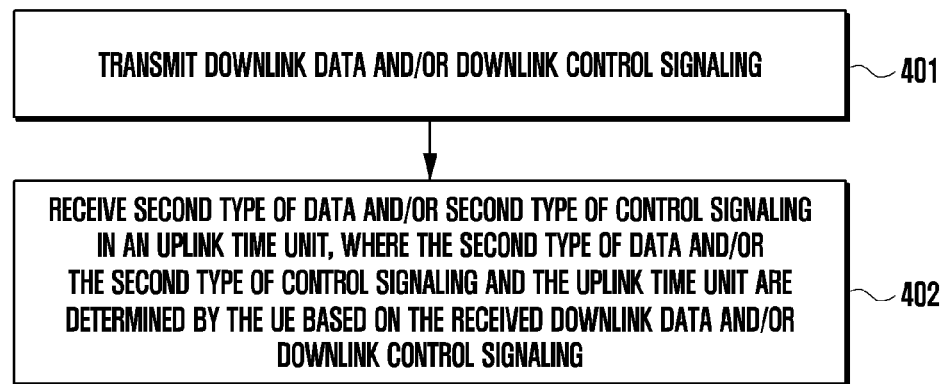
FIG. 4 illustrates a flowchart of a method performed by a base station according to an embodiment of the disclosure.

FIG. 4 illustrates a flowchart of a method performed by a base station according to an embodiment of the disclosure.

Firstly, in step S401, a base station transmits downlink data and/or downlink control signaling to a UE.

In step S402, the base station receives the second type of data and/or the second type of control signaling from the UE in an uplink time unit, where the second type of data and/or the second type of control signaling and the uplink time unit are determined by the UE based on the received downlink data and/or downlink control signaling.

Those skilled in the art will understand that the base station decodes the second type of data and/or the second type of control signaling based on methods corresponding to the methods performed by the UE in the above embodiments.

In some implementations, the uplink channel includes a PUCCH or a PUSCH.

If the HARQ-ACK information transmitted in the same uplink time unit does not include HARQ-ACK information for any DCI format, nor does it include HARQ-ACK information for dynamically scheduled PDSCH(s) (for example, PDSCH scheduled by a DCI format) and/or DCI, or the HARQ-ACK information transmitted in the same uplink time unit only includes HARQ-ACK information for one or more SPS PDSCHs, the UE may generate the HARQ-ACK information according to a rule for generating an SPS PDSCH HARQ-ACK codebook.

If the HARQ-ACK information transmitted in the same uplink time unit includes HARQ-ACK information for any DCI format, and/or HARQ-ACK information for dynamically scheduled PDSCH(s) (e.g., PDSCH scheduled by a DCI format) and/or DCI, the UE may generate the HARQ-ACK information according to a rule for generating a HARQ-ACK codebook for the dynamically scheduled PDSCH and/or the DCI. For example, the UE determines to generate a semi-static HARQ-ACK codebook (e.g., Type-1 HARQ-ACK codebook in 3GPP TS 38.213) or a dynamic HARQ-ACK codebook (e.g., a Type-2 HARQ-ACK codebook in 3GPP TS 38.213) or an enhanced dynamic HARQ-ACK codebook (e.g., a Type-2 HARQ-ACK codebook based on grouping and HARQ-ACK retransmission in 3GPP TS 38.213).

Methods for generating a HARQ-ACK codebook will be described in detail below. Unless otherwise specified, the methods for generating a HARQ-ACK codebook described in the disclosure may be applicable to the same priority. Additionally or alternatively, the methods for generating a HARQ-ACK codebook described in the disclosure may also be applicable to multiple priorities.

The UE may be configured with one or more SPS PDSCH configurations in a serving cell c. An SPS PDSCH configuration may be configured with a number $N_{PDSCH}^{repeat}$ of repetition transmissions, and $N_{PDSCH}^{repeat}$ may be an integer greater than or equal to 1. If the number of repetition transmissions between slots is not configured, it may be 1 by default. An SPS PDSCH configuration may be configured with a period P, which may be in units of slots, and may be an integer greater than or equal to 1. For an SPS PDSCH that transmits HARQ-ACK information in the same uplink time unit, the HARQ-ACK information for the SPS PDSCH needs to be multiplexed in the same HARQ-ACK codebook. This HARQ-ACK codebook may be transmitted on a PUCCH in this uplink time unit.

When there is HARQ-ACK information only for SPS PDSCH reception(s) in the HARQ-ACK codebook, for example, there is no HARQ-ACK information for dynamically scheduled PDSCH(s) (for example, the dynamically scheduled PDSCH(s) may be a PDSCH scheduled by a DCI format; for example, the dynamically scheduled PDSCH(s) may include the firstly activated SPS PDSCH), and there is no HARQ-ACK information for DCI (for example, DCI indicating SPS PDSCH release, and for another example, DCI indicating secondary cell (SCell) dormancy) in the HARQ-ACK codebook, the UE may generate the HARQ-ACK codebook according to the following method.

A HARQ-ACK codebook may include one or more first-stage HARQ-ACK sub-codebooks. A first-stage HARQ-ACK sub-codebook may be a HARQ-ACK codebook for a serving cell.

If the UE is configured with multiple serving cells, each serving cell generates its own first-stage HARQ-ACK sub-codebook respectively, and the first-stage HARQ-ACK sub-codebook for each serving cell constitutes a HARQ-ACK codebook according to the serving cell index in an order from smallest to largest (or in another order, for example, from largest to smallest). For example, a serving cell may be a configured serving cell for the UE, or a configured and activated serving cell for the UE.

A first-stage HARQ-ACK sub-codebook may include one or more second-stage HARQ-ACK sub-codebooks. A second-stage HARQ-ACK sub-codebook is a HARQ-ACK codebook for an SPS PDSCH configuration in the corresponding service cell thereof. For example, the SPS PDSCH configuration may be a configured SPS PDSCH configuration for the UE, or a configured and activated SPS PDSCH configuration for the UE. A second-stage HARQ-ACK sub-codebook included in a first-stage HARQ-ACK sub-codebook is sorted according to the SPS PDSCH configuration index configured by the serving cell in an order from smallest to largest (or in another order, for example, from largest to smallest). Alternatively, a second-stage HARQ-ACK sub-codebook included in a first-stage HARQ-ACK sub-codebook is sorted according to the index of the configured and activated SPS PDSCH configuration in the serving cell in an order from smallest to largest (or in another order, for example, from largest to smallest).

A second-stage HARQ-ACK sub-codebook in a first-stage HARQ-ACK sub-codebook may include one or more third-stage HARQ-ACK sub-codebooks. A third-stage HARQ-ACK sub-codebook in a second-stage HARQ-ACK sub-codebook in a first-stage HARQ-ACK sub-codebook is a HARQ-ACK codebook in a downlink time unit for the SPS PDSCH configuration in the corresponding service cell thereof. For example, a downlink time unit may be a slot or a sub-slot. A third-stage HARQ-ACK sub-codebook in a second-stage HARQ-ACK sub-codebook in a first-stage HARQ-ACK sub-codebook corresponding to a serving cell is sorted according to the index(es) of the downlink time unit(s) for SPS PDSCH reception(s) in an order from smallest to largest (or in another order, for example, from largest to smallest). For example, a third-stage HARQ-ACK sub-codebook in a second-stage HARQ-ACK sub-codebook in a first-stage HARQ-ACK sub-codebook corresponding to a serving cell is sorted according to a slot index in an order from smallest to largest (or in another order, for example, from largest to smallest). For example, the HARQ-ACK codebook may be generated according to Pseudo code-1.

| Pseudo code -1 |
|---|

```
Set N_cells^DL to the number of serving cells configured to the UE
Set N_c^SPS to the number of SPS PDSCH configuration(s) configured to the UE for
serving cell c
    Set N_c^DL to the number of DL slots for SPS PDSCH reception(s) on serving cell c with
    HARQ-ACK information multiplexed on the PUCCH
    Set j = 0 - HARQ-ACK information bit index
    Set c = 0 - serving cell index
    while c < N_cells^DL
        Set s = 0 - SPS PDSCH configuration index
        while s < N_c^SPS
            Set n_D = 0 - slot index
            while n_D < N_c^DL
                if {
                    a UE is configured to receive SPS PDSCH(s) from slot n_D -
                    N_PDSCH^repeat + 1 to slot n_D for SPS PDSCH configuration s on
                    serving cell c, excluding SPS PDSCHs that are not required to be
                    received due to overlapping with other SPS PDSCH(s) (for example,
                    SPS PDSCH(s) that does not need to be received, which may be
                    determined according to 38.214), or based on a UE capability for a
                    number of PDSCH receptions in a slot (for example, SPS PDSCH(s)
                    that does not need to be received, which may be determined
                    according to 38.214), or due to overlapping with a set of symbols (for
                    example, OFDM symbols) indicated as uplink by higher layer
                    signaling in a semi-static frame structure (for example, the parameter
                    tdd-UL-DL-ConfigurationCommon or the parameter tdd-UL-DL-
                    ConfigurationDedicated) where N_PDSCH^repeat may be provided by higher
                    layer signalling (for example, N_PDSCH^repeat may be provided by pdsch-
                    AggregationFactor in sps-Config or, if pdsch-AggregationFactor is
                    not included in sps-Config, N_PDSCH^repeat may be provided by pdsch-
                    AggregationFactor in pdsch-config), and
                    HARQ-ACK information for all the SPS PDSCH are associated with
                    the PUCCH
                }
                õ_j^ACK = HARQ-ACK information bit for the SPS PDSCH reception
                j = j + 1;
                end if
                n_D = n_D + 1;
            end while
            s = s + 1;
        end while
        c = c + 1;
    end while
```

In a TDD system, if the UE does not transmit a HARQ-ACK codebook including HARQ-ACK information only for SPS PDSCH reception for various reasons, for example, if one or more symbols carrying a PUCCH or PUSCH for the HARQ-ACK codebook in an uplink time unit used by the UE to transmit the HARQ-ACK codebook including the HARQ-ACK information only for SPS PDSCH reception are configured as downlink by higher layer signaling, or one or more symbols carrying the PUCCH or PUSCH for the HARQ-ACK codebook in the uplink time unit are indicated as downlink by dynamic signaling so that the HARQ-ACK codebook including the HARQ-ACK information only for SPS PDSCH reception cannot be transmitted, transmission of the HARQ-ACK codebook including the HARQ-ACK information only for SPS PDSCH reception may be delayed. The delayed HARQ-ACK codebook including HARQ-ACK information only for SPS PDSCH reception (e.g., the delayed HARQ-ACK codebook including HARQ-ACK information only for SPS PDSCH reception) may be transmitted by the method described in connection with FIG. 5.

The aforementioned HARQ-ACK codebook including HARQ-ACK information only for SPS PDSCH reception may be a HARQ-ACK codebook of HARQ-ACK information for one or more SPS PDSCH receptions.

In addition, the aforementioned HARQ-ACK codebook including HARQ-ACK information only for SPS PDSCH reception may be, for example, a HARQ-ACK codebook including HARQ-ACK information only for SPS PDSCH reception that is required to be delayed due to various reasons, or a HARQ-ACK codebook including HARQ-ACK information only for SPS PDSCH reception that is not transmitted and/or the transmission of which is cancelled.

The aforementioned HARQ-ACK codebook including HARQ-ACK information only for SPS PDSCH reception that is not transmitted and/or the transmission of which is cancelled may occur for the following reasons: if a PUCCH and/or a PUSCH carrying the HARQ-ACK codebook for the SPS PDSCH overlaps with a set of symbols which are indicated as downlink symbols and/or flexible symbols by higher layer signaling (e.g., the parameter of tdd-UL-DL-ConfigurationCommon or the parameter of tdd-UL-DL-ConfigurationDedicated) and/or DCI (e.g., dynamic DFI), the UE does not transmit and/or cancels transmitting the HARQ-ACK for the SPS PDSCH. However, the reason why the HARQ-ACK codebook including the HARQ-ACK information only for SPS PDSCH reception that is not transmitted and/or transmission of which is cancelled occurs is not limited thereto.

In a TDD system, if one or more symbols in an uplink time unit are configured as downlink by higher layer signaling, or one or more symbols in an uplink time unit are indicated as downlink by dynamic signaling, the UE cannot transmit a HARQ-ACK codebook including HARQ-ACK information for SPS PDSCH reception (for example, the HARQ-ACK codebook including the HARQ-ACK information for SPS PDSCH reception may be a HARQ-ACK codebook including HARQ-ACK information only for SPS PDSCH reception). The HARQ-ACK codebook including the HARQ-ACK information for SPS PDSCH reception may include HARQ-ACK information for only one SPS PDSCH reception or more than one SPS PDSCH reception. For example, the HARQ-ACK codebook including the HARQ-ACK information for SPS PDSCH reception may be a delayed HARQ-ACK codebook including HARQ-ACK information only for SPS PDSCH reception. The HARQ-ACK codebook including the HARQ-ACK information only for SPS PDSCH reception (e.g., a delayed HARQ-ACK codebook including HARQ-ACK information only for SPS PDSCH reception) may be transmitted in the following manner.

For example, the transmission of a HARQ-ACK codebook including HARQ-ACK information only for SPS PDSCH reception (for example, a delayed HARQ-ACK codebook including HARQ-ACK information only for SPS PDSCH reception; for example, a HARQ-ACK codebook including HARQ-ACK information only for SPS PDSCH reception that is not transmitted and/or transmission of which is cancelled; for example, the HARQ-ACK codebook including the HARQ-ACK information only for SPS PDSCH reception may be a HARQ-ACK codebook of HARQ-ACK information for one or more SPS PDSCH receptions) is delayed until the first and/or the next available uplink resource.

For example, the transmission of HARQ-ACK of HARQ-ACK information for a SPS PDSCH that is not transmitted and/or is cancelled is delayed until the first and/or the next available uplink resource. For example, if a PUCCH carrying the HARQ-ACK codebook for this SPS PDSCH overlaps with a set of symbols which are indicated as downlink symbols and/or flexible symbols by higher layer signaling (e.g., the parameter of tdd-UL-DL-ConfigurationCommon or the parameter of tdd-UL-DL-ConfigurationDedicated) and/or DCI (e.g., dynamic DFI), the UE does not transmit and/or cancels transmitting HARQ-ACK for this SPS PDSCH.

For example, the uplink resource may be an available PUCCH resource and/or a PUSCH resource.

For example, the UE may report (or transmit) a capability to support that the transmission of the HARQ-ACK for a SPS PDSCH that is not transmitted and/or is cancelled is delayed until the first and/or the next available uplink resource (e.g., PUCCH resource). For example, the UE may report (or transmit) a capability to support that the HARQ-ACK for a SPS PDSCH that is not transmitted and/or transmission of which is cancelled is multiplexed with the HARQ-ACK for a SPS PDSCH and/or dynamically scheduled PDSCH(s) and/or DCI in the same PUCCH and/or PUSCH for transmission.

For example, the UE may report (or transmit) a capability to support that a HARQ-ACK codebook including HARQ-ACK information only for SPS PDSCH reception (e.g., a delayed HARQ-ACK codebook including HARQ-ACK information only for SPS PDSCH reception) is multiplexed with HARQ-ACK information for dynamically scheduled PDSCH(s) and/or DCI in the same PUCCH for transmission.

For example, the UE may report (or transmit) a capability to support that a HARQ-ACK codebook including HARQ-ACK information only for SPS PDSCH reception (e.g., a delayed HARQ-ACK codebook including HARQ-ACK information only for SPS PDSCH reception) is multiplexed with HARQ-ACK information for a SPS PDSCH and/or dynamically scheduled PDSCH(s) and/or DCI in the same PUCCH for transmission.

For example, the above UE capability reporting may be applicable to all HARQ-ACK codebook types, or the UE capability reporting is for a specific HARQ-ACK codebook type. For example, the specific HARQ-ACK codebook type may be semi-static, or dynamic, or enhanced dynamic. For example, it may be configured by higher layer signaling (e.g., a specified parameter) whether the UE is able to delay the transmission of a HARQ-ACK codebook including HARQ-ACK information only for SPS PDSCH reception (e.g., a delayed HARQ-ACK codebook including HARQ-ACK information only for SPS PDSCH reception) until the first and/or next available uplink resource. For example, the specified parameter may be configured in the parameter of PUCCH-Config, and/or the parameter of BWP-UplinkDedicated, and/or the parameter of SPS-Config.

For example, it may be configured by higher layer signaling (e.g., a specified parameter) whether the UE is able to delay the transmission of HARQ-ACK for a SPS PDSCH that is not transmitted and/or transmission of which is cancelled to the first and/or next available uplink resource. For example, the specified parameter may be configured in the parameter of PUCCH-Config, and/or the parameter of BWP-UplinkDedicated, and/or the parameter of SPS-Config.

If the HARQ-ACK codebook including the HARQ-ACK information only for SPS PDSCH reception (for example, a delayed HARQ-ACK codebook including HARQ-ACK information only for SPS PDSCH reception) and HARQ- ACK for at least one dynamically scheduled PDSCH (e.g., the dynamically scheduled PDSCH may be a PDSCH scheduled by one DCI format, for example, the dynamically scheduled PDSCH may include the first activated SPS PDSCH) and/or DCI (for example, DCI indicating SPS PDSCH release, and for another example, DCI indicating SCell dormancy) are transmitted in the same uplink time unit, the HARQ-ACK codebook including the HARQ-ACK information only for SPS PDSCH reception and the HARQ-ACK for the dynamically scheduled PDSCH(s) and/or DCI may be multiplexed in the same PUCCH for transmission.

For example, it may be configured by higher layer signaling (e.g., a specified parameter) whether the UE is able to multiplex a HARQ-ACK codebook including HARQ-ACK information only for SPS PDSCH reception (e.g., a delayed HARQ-ACK codebook including HARQ-ACK information only for SPS PDSCH reception) with HARQ-ACK for dynamically scheduled PDSCH(s) and/or DCI in the same PUCCH for transmission. For example, the specified parameter may be configured in the parameter of PUCCH-Config, and/or the parameter of BWP-UplinkDedicated, and/or the parameter of SPS-Config.

If a PDSCH HARQ-ACK codebook configuration parameter (e.g., the parameter of pdsch-HARQ-ACK-Codebook) is configured to be semi-static (e.g., semi-static), the UE generates a HARQ-ACK codebook according to a rule for a semi-static HARQ-ACK codebook (e.g., Type-1 HARQ-ACK codebook in 3GPP TS 38.213). If the HARQ-ACK codebook including the HARQ-ACK information only for SPS PDSCH reception (e.g., a delayed HARQ-ACK codebook including HARQ-ACK information only for SPS PDSCH reception) and HARQ-ACK for at least one dynamically scheduled PDSCH and/or DCI is transmitted in the same uplink time unit, enhancement of the existing Type-1 HARQ-ACK codebook of 3GPP TS 38.213 (for example, Rel-15 and/or Rel-16) is required. The following methods may be adopted.

For example, a specified parameter (for example, K1') may be used to indicate a time interval between an actual transmission time of HARQ-ACK for an SPS PDSCH and the PDSCH. If the transmission of the HARQ-ACK for the SPS PDSCH is not cancelled and/or delayed, K1'=K1.

For example, it may be specified by protocols or configured by higher layer signaling that K1' belongs to a set Kset of K1 for generating a semi-static HARQ-ACK codebook. If a time interval between a delayed transmission time of HARQ-ACK for an SPS PDSCH and the PDSCH does not belong to the set of K1 for generating a semi-static HARQ-ACK codebook, the UE does not transmit the HARQ-ACK for this SPS PDSCH. For example, a period of an SPS PDSCH configuration is one slot, and DCI for activating this SPS PDSCH configuration indicates K1=1. A time unit of PUCCH is a slot. An uplink and downlink frame structure for slot 0 to slot 9 is DDDDDUUUUU, where D indicates downlink and U indicates uplink. The set of K1 for generating the semi-static HARQ-ACK codebook is {1,2 3,4}. The earliest feedback can only be made in slot 5 for SPS PDSCHs received in slots 0, 1, 2, 3 and 4. If feedback is made in slot 5 for an SPS PDSCH received in slot 0, K1'=5, and at this time, K1' does not belong to the set of K1, and the UE does not transmit HARQ-ACK for the SPS PDSCH received in slot 0. K1' corresponding to SPS PDSCHs received in slots 1, 2, 3 and 4 is 4, 3, 2 and 1 respectively. At this time, K1' belongs to the set of K1, and the UE transmits HARQ-ACK for the SPS PDSCHs received in slots 1, 2, 3 and 4. Position(s) for SPS PDSCH(s) in the semi-static HARQ-ACK codebook is(are) determined according to K1' and time domain resource(s) for the SPS PDSCH(s). For example, the UE reports HARQ-ACK information for corresponding SPS PDSCH reception(s) only in a HARQ-ACK codebook transmitted in a slot indicated by K1'. In a HARQ-ACK codebook transmitted in a slot not indicated by K1' by the UE, HARQ-ACK information for SPS PDSCH reception(s) is NACK.

For example, if a time interval between a delayed transmission time of HARQ-ACK for an SPS PDSCH and the SPS PDSCH does not belong to the set of K1 for generating a semi-static HARQ-ACK codebook, the UE may delay transmission of the HARQ-ACK for this SPS PDSCH. Alternatively, the UE may delay transmission of HARQ-ACKs for all SPS PDSCHs (for example, the all SPS PDSCHs may be SPS PDSCHs for which HARQ-ACKs are not transmitted). Alternatively, the UE does not expect HARQ-ACK for a PDCCH and/or DCI scheduling a PDSCH to be transmitted in a same time unit with the HARQ-ACK information only for an SPS PDSCH whose transmission is delayed. The method can increase the transmission probability of HARQ-ACK, reduce retransmission of downlink data, improve the spectrum efficiency of the system and improve the network performance.

For example, it may be specified by protocols or configured by higher layer signaling that the set of K1 for generating the semi-static HARQ-ACK codebook includes all values of K1 and all possible values of K1'. For example, the value of K1' may be a possible value of K1' determined according to the current slot. Alternatively, the value of K1' may be a possible value of K1' determined for any slot. The UE reports HARQ-ACK information for corresponding SPS PDSCH reception(s) only in a HARQ-ACK codebook transmitted in a slot indicated by K1'. In a HARQ-ACK codebook in a slot not indicated by K1' transmitted by the UE, the HARQ-ACK information for SPS PDSCH reception(s) is NACK.

For example, a set of K1 configured by higher layer signaling is {1,3,5}. The maximum value of K1' may be the maximum value of K1. The maximum value of K1' may also be configured by higher layer signaling. The minimum value of K1' may be the minimum value of K1. The minimum value of K1' may also be configured by higher layer signaling. The minimum value of K1' may also be 0. The minimum value of K1' may also be 1. A possible value of K1' may be an integer between the minimum value of K1' and the maximum value of K1'. For example, the maximum value of K1' is 5, the minimum value of K1' is 1, and possible values of K1' is set {1,2,3,4, 5}. At this time, the set of K1 for generating the semi-static HARQ-ACK codebook is {1, 2, 3, 4, 5}. According to the method, the set of K1 for the semi-static HARQ-ACK codebook is determined by the maximum value and/or the minimum value of K1', so that implementation complexity is low, consistency of understanding of a HARQ-ACK codebook by a UE and a base station may be ensured, and reliability of the HARQ-ACK codebook is improved.

For example, a HARQ-ACK codebook may consist of a semi-static HARQ-ACK sub-codebook for dynamic scheduling and a delayed HARQ-ACK sub-codebook only for SPS PDSCH reception. The semi-static HARQ-ACK sub-codebook for dynamic scheduling may be before or after the delayed HARQ-ACK sub-codebook only for SPS PDSCH reception. The delayed HARQ-ACK sub-codebook only for SPS PDSCH reception may be generated by Pseudo code-1, in which set $N_c^{DL}$ be a number of DL slots in the serving cell c, and HARQ-ACK information for SPS PDSCH in these DL slots is multiplexed in the PUCCH. For example, HARQ-ACK information multiplexed in the PUCCH may be HARQ-ACK information for SPS PDSCH(s) determined according to K1'. The semi-static HARQ-ACK sub-codebook for dynamic scheduling may be generated according to a pseudo code for a Type-1 HARQ-ACK codebook transmitted in a PUCCH in 3GPP TS38.213.

For example, a HARQ-ACK codebook may consist of a semi-static HARQ-ACK sub-codebook for dynamic scheduling and a compressed delayed HARQ-ACK sub-codebook only for SPS PDSCH reception. For example, the compressed delayed HARQ-ACK sub-codebook only for SPS PDSCH reception may be of 1 bit, and the delayed HARQ-ACK sub-codebook only for SPS PDSCH reception may perform a bundling operation. For example, if all HARQ-ACK bits are ACK, the bundled 1-bit is ACK, otherwise it is NACK. For example, a number of bits for the compressed delayed HARQ-ACK sub-codebook only for SPS PDSCH reception may be equal to a number of downlink serving cells. Delayed HARQ-ACK bits only for SPS PDSCH reception on each downlink serving cell may perform a bundling operation. For example, a number of bits for the compressed delayed HARQ-ACK sub-codebook only for SPS PDSCH reception may be equal to a number of downlink serving cells. The bundling operation may be performed on delayed HARQ-ACK bits only for SPS PDSCH reception in each downlink serving cell.

By indicating whether to transmit a HARQ-ACK codebook including HARQ-ACK information only for SPS PDSCH reception in a PUCCH and/or a PUSCH through DCI explicitly, this method improves scheduling flexibility, ensures consistency of understanding of a HARQ-ACK codebook by a UE and a base station, and improves reliability of the HARQ-ACK codebook.

For a given HARQ process, the UE does not expect to receive another PDSCH for this HARQ process before the end of the transmission of HARQ-ACK for PDSCH(s) for this HARQ process (e.g., an expected HARQ-ACK transmission, or an actual HARQ-ACK transmission). As for an SPS PDSCH configuration, the SPS PDSCH reception is periodic; if the delay time of the HARQ-ACK codebook including the HARQ-ACK information only for SPS PDSCH reception (e.g., a delayed HARQ-ACK codebook including HARQ-ACK information only for SPS PDSCH reception) is too long, the UE will receive another PDSCH for the same HARQ process before the end of the HARQ-ACK feedback for this PDSCH. The UE may consider the scheduling to be wrong. In order to solve this problem, the following methods may be adopted.

For example, it may be specified by protocols that for a given HARQ process, if the UE receives an SPS PDSCH for this HARQ process before the end of the transmission of HARQ-ACK for another SPS PDSCH for this HARQ process (e.g., an expected HARQ-ACK transmission, or an actual HARQ-ACK transmission), the UE considers the SPS PDSCH received later as an empty SPS PDSCH. The UE considers that the base station does not transmit the SPS PDSCH received later. It may be further specified that the UE does not need to feed back the HARQ-ACK for the SPS PDSCH received later. Alternatively, it may be specified that the UE needs to feed back HARQ-ACK for the SPS PDSCH received later. If the UE does not transmit other HARQ-ACK information in an uplink time unit, the UE does not feed back the HARQ-ACK for the SPS PDSCH received later.

For another example, it may be specified by protocols that for a given HARQ process, if the UE is configured to, before the end of the transmission of HARQ-ACK for an SPS PDSCH for this HARQ process (e.g., an expected HARQ-ACK transmission, or an actual HARQ-ACK transmission), receive (e.g., configured by higher layer signaling to receive, or determined according to configuration of higher layer signaling to need to receive) another SPS PDSCH for this HARQ process, the UE considers the latter SPS PDSCH (i.e., the other SPS PDSCH) configured to be received as an empty SPS PDSCH. The UE considers that the base station does not transmit the latter SPS PDSCH configured to be received. It may be further specified that the UE does not need to feed back the HARQ-ACK for the latter SPS PDSCH configured to be received. Alternatively, it may be specified that the UE needs to feed back the HARQ-ACK for the latter SPS PDSCH configured to be received. If the UE does not transmit other HARQ-ACK information in an uplink time unit, the UE does not feed back the HARQ-ACK for the latter SPS PDSCH configured to be received.

The method clarifies the behavior of the UE, avoids that the UE considers the scheduling to be wrong, improves the reliability of data transmission, reduces the user plane latency, and improves the spectrum efficiency of the network.

For example, it may be specified by protocols that for a given HARQ process, if the UE receives an SPS PDSCH for this HARQ process before the end of the transmission of HARQ-ACK for another PDSCH for this HARQ process (e.g., an expected HARQ-ACK transmission, or an actual HARQ-ACK transmission), the UE does not transmit the HARQ-ACK information for the earlier SPS PDSCH (i.e., the other PDSCH), or the UE does not transmit the HARQ-ACK codebook for the earlier SPS PDSCH. The UE may clear the HARQ buffer of the earlier SPS PDSCH. Alternatively, if the UE is configured with semi-static HARQ-ACK codebook and there is a bit corresponding to the HARQ-ACK information for the earlier SPS PDSCH in the semi-static HARQ-ACK codebook, it may be specified by protocols and/or configured by higher layer signaling that the UE transmits the HARQ-ACK information for the earlier SPS PDSCH in the corresponding bit in the HARQ-ACK codebook, or the UE transmits NACK in the corresponding bit in the HARQ-ACK codebook. If there is no bit corresponding to the HARQ-ACK information for the earlier SPS PDSCH in the semi-static HARQ-ACK codebook, the UE does not transmit the HARQ-ACK information for the earlier SPS PDSCH.

The method clarifies the behavior of the UE, avoids that the UE considers the scheduling to be wrong, improves the reliability of data transmission, reduces the user plane latency, and improves the spectrum efficiency of the network. Feeding back the HARQ-ACK information for the earlier SPS PDSCH in a semi-static HARQ-ACK codebook can reduce the retransmission of PDSCH and improve the spectral efficiency of the system.

For another example, it may be specified by protocols that for a given HARQ process, if the UE is configured to receive (e.g., configured by higher layer signaling to receive, or determined according to configuration of higher layer signaling to need to receive) an SPS PDSCH for this HARQ process before the end of the transmission of HARQ-ACK for another SPS PDSCH for this HARQ process (e.g., an expected HARQ-ACK transmission, or an actual HARQ-ACK transmission), the UE does not transmit the HARQ-ACK information for the earlier SPS PDSCH (i.e., the other SPS PDSCH), or the UE does not transmit the HARQ-ACK codebook for the earlier SPS PDSCH. UE empties the HARQ buffer of the earlier SPS PDSCH. Alternatively, if the UE is configured with semi-static HARQ-ACK codebook and there is a bit corresponding to the HARQ-ACK information for the earlier SPS PDSCH in the semi-static HARQ-ACK codebook, it may be specified by protocols and/or configured by higher layer signaling that the UE transmits the HARQ-ACK information for the SPS PDSCH in the corresponding bit in the HARQ-ACK codebook, or the UE transmits NACK in the corresponding bit in the HARQ-ACK codebook. If there is no bit corresponding to the HARQ-ACK information for the earlier SPS PDSCH in the semi-static HARQ-ACK codebook, the UE does not transmit the HARQ-ACK information for the earlier SPS PDSCH.

In this scheme, when DCI is missed, the consistency of understanding of HARQ-ACK codebook between the UE and the base station can be ensured. The reliability of the HARQ-ACK codebook can be improved, the downlink PDSCH retransmission can be reduced, and the spectrum efficiency of the system can be improved. The retransmission of the PDSCH can be reduced and the spectral efficiency of the system can be improved by feeding back the HARQ-ACK information for the earlier SPS PDSCH in a semi-static HARQ-ACK codebook. For example, a specific parameter may be configured by higher layer signaling to indicate a maximum latency W. The specific parameter may be configured in the parameter of PUCCH-Config, and/or the parameter of BWP-UplinkDedicated, and/or the parameter of SPS-Config to indicate the maximum latency. The maximum latency may be defined as the maximum time interval between the time when the HARQ-ACK for the SPS PDSCH is actually transmitted and the received SPS PDSCH (e.g., the end position of the received SPS PDSCH). For example, the time interval may be in units of slots, and/or sub-slots, and/or milliseconds. The maximum latency may also be defined as the maximum value of the time interval K1 between the time when the HARQ-ACK for the SPS PDSCH is actually transmitted and the time when the HARQ-ACK is expected to be transmitted (e.g., the time when the HARQ-ACK is expected to be transmitted may be an uplink time unit resulted after K1 is added to the uplink time unit overlapping with the end position of the received SPS PDSCH, where K1 may be indicated in an activation DCI of this SPS PDSCH). For example, the time interval may be in units of slots, and/or sub-slots, and/or milliseconds.

For example, the maximum latency configured by higher layer signaling needs to satisfy the following restrictions: for a given HARQ process, the UE does not expect to receive a PDSCH for this HARQ process before the end of the transmission of HARQ-ACK for another PDSCH for this HARQ process (e.g., an actual HARQ-ACK transmission).

For example, the maximum latency configured by higher layer signaling may not be greater than the maximum latency Ymax supported by the capability reported by the UE. Ymax may be in units of uplink slots or downlink slots, or uplink sub-slots or milliseconds. Ymax may be reported based on a UE, Ymax may also be reported based on a priority, and Ymax may also be reported based on a carrier. For another example, if the unit of the maximum latency Ymax supported by the capability reported by the UE is different from the unit of the maximum latency configured by the higher layer signaling, it needs to be satisfied that the absolute time of the maximum latency configured by the higher layer signaling is not greater than the absolute time of the maximum latency Ymax supported by the capability reported by the UE.

For example, the maximum latency may also be determined by a formula. The maximum latency may be the minimum of the maximum latencies configured for all SPS PDSCHs. For another example, for a priority, the maximum latency may be the minimum of the maximum latencies configured for all SPS PDSCHs with this priority.

For example, a period of an SPS PDSCH is P and the number of HARQ processes is N. The maximum latency Wi configured for this SPS PDSCH (the maximum time interval between the time when the HARQ-ACK for the SPS PDSCH is actually transmitted and the end position of the received SPS PDSCH) may be calculated by the following formula.

$$Wi = N \times P,$$

Alternatively, $Wi = \lfloor N \times P \times 2^{\mu_{PUCCH} - \mu_{PDSCH}} \rfloor$, where $\mu_{PDSCH}$ and $\mu_{PDCCH}$ are subcarrier spacing configuration of PDSCH and PUCCH respectively.

Alternatively, $Wi = N \times P - K1$, where K1 is a HARQ-ACK feedback time interval indicated in an activation DCI of this SPS PDSCH configuration.

Alternatively, $Wi = \lfloor N \times P \times 2^{\mu_{PUCCH} - \mu_{PDSCH}} \rfloor - K1$ Alternatively, $Wi = \lfloor N \times P \times 2^{\mu_{PUCCH} - \mu_{PDSCH}} \rfloor - \alpha$, where $\alpha$ may be specified by protocols or configured by higher layer signaling, and $\alpha$ may be an integer.

Alternatively, $i = \lfloor N \times P \times 2^{\mu_{PUCCH} - \mu_{PDSCH}} - \beta \rfloor$, where $\beta$ may be specified by protocols or configured by higher layer signaling, and $\beta$ may be an integer or rational number.

The method clarifies the behavior of the UE, avoids that UE considers the scheduling to be wrong, improves the reliability of data transmission, reduces the user plane latency, and improves the spectrum efficiency of the network.

For example, the maximum latency may also be indicated in DCI. For example, the maximum latency may also be indicated in an uplink DCI format. For example, the maximum latency may also be indicated in a downlink DCI format. In DCI, a new field may be used, one or more certain fields may be reused, and one or more bits may be reused to indicate the maximum latency.

For example, a latency of the HARQ-ACK codebook including the HARQ-ACK information only for SPS PDSCH reception may also be indicated in DCI. For example, the latency of the HARQ-ACK codebook including the HARQ-ACK information only for SPS PDSCH reception may also be indicated in an uplink DCI format. For example, the latency of the HARQ-ACK codebook including the HARQ-ACK information only for SPS PDSCH reception may also be indicated in a downlink DCI format. In DCI, a new field may be used, one or more certain fields may be reused, and one or more bits may be reused, to indicate the latency of the HARQ-ACK codebook including the HARQ-ACK information only for SPS PDSCH reception.

For example, the DCI may also indicate whether to multiplex the HARQ-ACK codebook including the HARQ-ACK information only for SPS PDSCH reception, that is, whether to multiplex the HARQ-ACK codebook including the HARQ-ACK information only for SPS PDSCH reception with a semi-static HARQ-ACK codebook or dynamic HARQ-ACK codebook or enhanced dynamic HARQ-ACK codebook. For example, whether to multiplex the HARQ-ACK codebook including the HARQ-ACK information only for SPS PDSCH reception may also be indicated in an uplink DCI format. For example, whether to multiplex the HARQ-ACK codebook including the HARQ-ACK information only for SPS PDSCH reception may also be indicated in a downlink DCI format. In the DCI, a new field may be used, one or more certain fields may be reused, and one or more bits may be reused, to indicate whether to multiplex the HARQ-ACK codebook including the HARQ-ACK information only for SPS PDSCH reception.

For example, the maximum latency or the latency of the HARQ-ACK codebook including the HARQ-ACK information only for SPS PDSCH reception, and whether to multiplex the HARQ-ACK codebook including the HARQ-ACK information only for SPS PDSCH reception may be indicated by different fields or by the same field.

By indicating whether to transmit a HARQ-ACK codebook including HARQ-ACK information only for SPS PDSCH reception in a PUCCH and/or a PUSCH through DCI explicitly, this method improves scheduling flexibility, ensures consistency of understanding of a HARQ-ACK codebook by a UE and a base station, and improves reliability of the HARQ-ACK codebook.

If a PDSCH HARQ-ACK codebook configuration parameter (e.g., the parameter of pdsch-HARQ-ACK-Codebook) is configured to be semi-static (e.g., semi-static), the UE generates a HARQ-ACK codebook according to a rule for a semi-static HARQ-ACK codebook (e.g., Type-1 HARQ-ACK codebook in 3GPP TS 38.213). If a PDSCH can be repeatedly transmitted in a slot, a time domain resource of the last PDSCH repetition transmission may be in a TDRA table. At this time, if the semi-static HARQ-ACK codebook (e.g., Type-1 HARQ-ACK codebook in 3GPP TS 38.213) is determined according to a TDRA table by higher layer signaling, there may be a situation that the last PDSCH repetition transmission has no corresponding bit in the semi-static HARQ-ACK codebook. This problem may be solved in the following modes.

For example, a HARQ-ACK codebook in a PUCCH in an uplink time unit may be determined by a possible PDSCH for which HARQ-ACK may be transmitted in this uplink time unit. For example, the uplink time unit of the PUCCH may be a sub-slot. For example, the uplink time unit of the PUCCH may be a slot.

For example, if a number of time unit intervals between an uplink time unit where an end time of a PDSCH is located and an uplink time unit where a PUCCH is located belongs to the set of K1, this PDSCH is a possible PDSCH for which HARQ-ACK may be transmitted in the uplink time unit where this PUCCH is located.

For example, if the PDSCH may be repeatedly transmitted, the end time of the PDSCH may be the end time of the last PDSCH repetition transmission.

Mode 1

Assuming that a PDSCH may be repeatedly transmitted in a slot, a time domain resource for the last repetition transmission may be determined according to a TDRA table configured by higher layer signaling and an interval $\overline{K}$ of repetition transmissions in a slot (for example, $\overline{K}$ may be configured by higher layer signaling, for example, configured by the parameter of startingSymbolOffsetK in the parameter of RepetitionSchemeConfig). An extended TDRA table may be determined from the determined time domain resource for the last repetition transmission and the TDRA table configured by higher layer signaling, and this extended TDRA table may include start and length indicators (SLIVs) of all possible PDSCH repetition transmissions. When determining a semi-static HARQ-ACK codebook for a serving cell, the maximum number of PDSCHs that may be received in a downlink slot may be determined from non-overlapping SLIVs included at most in the extended TDRA table in this slot. That is, the maximum number of possible PDSCHs for a semi-static HARQ-ACK codebook in a serving cell may be determined according to the extended TDRA table and the set of K1. For example, the TDRA table may be replaced by the extended TDRA table defined in this embodiment according to the way in which the Type-1 HARQ-ACK codebook is determined by 3GPP TS 38.213. The semi-static HARQ-ACK codebook for a serving cell may be determined according to the extended TDRA table and the set of K1. Then, for an uplink time unit, the UE may determine a PDSCH for which HARQ-ACK may be fed back in this uplink time unit according to the extended TDRA table and the set of K1. The semi-static HARQ-ACK codebook is determined according to the largest set of non-overlapping PDSCHs among these possible PDSCHs.

Figure 6A:
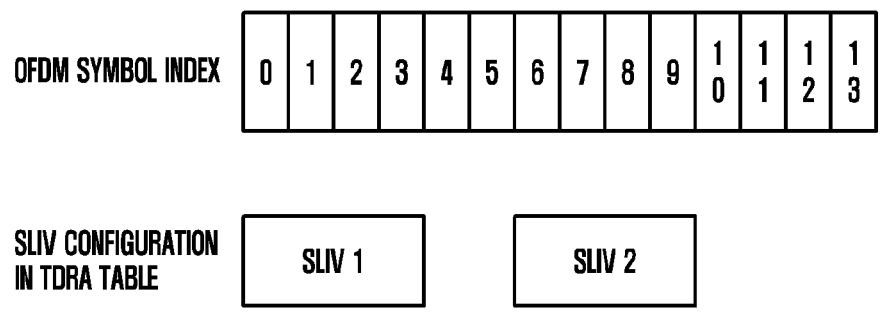
FIG. 6A illustrates an example of time domain resource allocation according to an embodiment of the disclosure.

For example, as shown in FIG. 6A, two possible SLIVs are configured in a time domain resource allocation (TDRA) table of a PDSCH configured by higher layer signaling. For example, it is configured by the parameter of pdsch-TimeDomainAllocationList in the parameter of PDSCH-Config. The starting symbol of SLIV1 is 0 and the length thereof is 4, and the starting symbol of SLIV2 is 6 and the length thereof is 4.

Figure 6B:
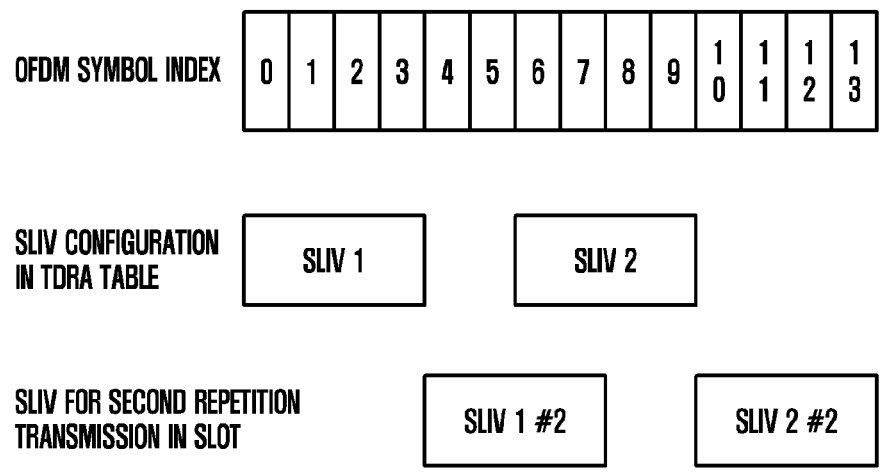
FIG. 6B illustrates an example of time domain resource allocation according to an embodiment of the disclosure.

The higher layer signaling configures that a PDSCH may be repeatedly transmitted in a slot. For example, the parameter of RepetitionScheme-r16 is set to 'TDMSchemeA'. A default value of a time interval between two PDSCH repetition transmissions in a slot is 0. A possible SLIV of the second PDSCH repetition transmission in the slot is shown in FIG. 6B. The extended TDRA table includes SLIV 1, SLIV 2, SLIV 1 #2 and SLIV 2 #2.

The maximum number of non-overlapping SLIVs in this slot is 3, which may be SLIV 1, SLIV 2, and SLIV 2 #2; or may be SLIV 1, SLIV 1 #2, and SLIV 2 #2. At most 3 PDSCH may be received in this slot.

A semi-static HARQ-ACK codebook for a PUCCH transmission in an uplink time unit may also be determined by PDSCH(s) included in the extended TDRA table in a downlink slot corresponding to the set of all K1 for the PUCCH transmission on the uplink time unit.

Mode 2

Assuming that a PDSCH scheduled by a DCI format is repeatedly transmitted in a slot, it may be according to a TDRA table configured by higher layer signaling that is used by the DCI format and an interval $\overline{K}$ of repetition transmissions in a slot (for example, $\overline{K}$ may be configured by higher layer signaling, for example, configured by the parameter of startingSymbolOffsetK in the parameter of RepetitionSchemeConfig). An extended SLIV includes two repetition transmissions in a slot. When determining a semi-static HARQ-ACK codebook for a serving cell, the maximum number of PDSCHs that may be received in a downlink slot may be determined by the maximum number of non-overlapping extended SLIVs in this slot. That is, the maximum number of possible PDSCHs included in a semi-static HARQ-ACK codebook for a serving cell may be determined according to a TDRA table including all extended SLIVs and the set of K1. For example, the TDRA table may be replaced by a TDRA table including all extended SLIVs defined in this embodiment according to the way in which the Type-1 HARQ-ACK codebook is determined by 3GPP TS 38.213. The semi-static HARQ-ACK codebook for a serving cell may be determined according to the extended TDRA table and the set of K1. Then, for an uplink time unit, the UE may determine a PDSCH for which HARQ-ACK may be fed back in this uplink time unit according to the extended TDRA table and the set of K1. The semi-static HARQ-ACK codebook is determined according to the largest set of non-overlapping PDSCHs among these possible PDSCHs.

For example, as shown in FIG. 6A, two possible SLIVs are configured in a time domain resource allocation (TDRA) table of a PDSCH for a DCI format that is configured by higher layer signaling, for example, configured by the parameter of pdsch-TimeDomainAllocationList in the parameter of PDSCH-Config, and for another example, configured by the parameter of pdsch-TimeDomainAllocationListForDCI-Format1-2-r16 in the parameter of PDSCH-Config. The starting symbol of SLIV1 is 0 and the length thereof is 4, and the starting symbol of SLIV2 is 6 and the length thereof is 4.

Figure 6C:
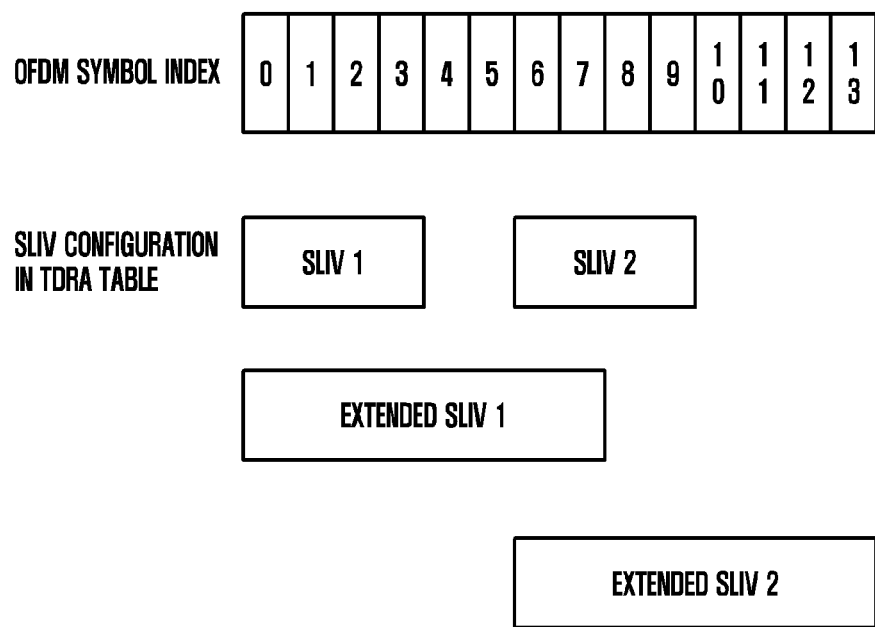
FIG. 6C illustrates an example of time domain resource allocation according to an embodiment of the disclosure.

The higher layer signaling configures that a PDSCH may be repeatedly transmitted in a slot. For example, the parameter of RepetitionScheme-r16 is set to 'TDMSchemeA'. A default value of a time interval between two PDSCH repetition transmissions in a slot is 0. The extended SLIVs of the second repetition transmission in the slot are shown in FIG. 6C. The TDRA table including all extended SLIVs includes extended SLIV 1 and extended SLIV 2.

The maximum number of non-overlapping extended SLIVs in this slot is 1, which may be extended SLIV 1 or extended SLIV 2. At most one PDSCH can be received in this slot.

Figure 6D:
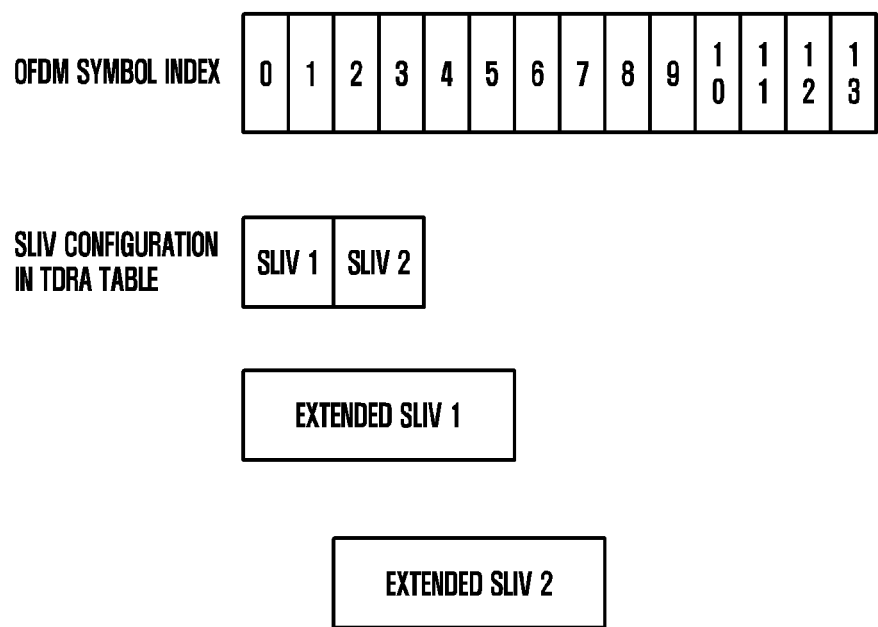
FIG. 6D illustrates an example of time domain resource allocation according to an embodiment of the disclosure.

For example, two possible SLIVs are configured in a time domain resource allocation (TDRA) table of a PDSCH for a DCI format that is configured by higher layer signaling, for example, configured by the parameter of pdsch-TimeDomainAllocationList in the parameter of PDSCH-Config, and for another example, configured by the parameter of pdsch-TimeDomainAllocationListForDCI-Format1-2-r16 in the parameter of PDSCH-Config. As shown in FIG. 6D, the starting symbol of SLIV1 is 0 and the length thereof is 2, and the starting symbol of SLIV2 is 2 and the length thereof is 2.

The higher layer signaling configures that a PDSCH may be repeatedly transmitted in a slot. For example, the parameter of RepetitionScheme-r16 is set to 'TDMSchemeA'. A time interval between two PDSCH repetition transmissions in a slot is configured as 2 symbols. The extended SLIVs of the second repetition transmission in the slot are shown in FIG. 6D. The TDRA table including all extended SLIVs includes extended SLIV 1 and extended SLIV 2.

An extended SLIV may be defined as including symbols occupied by two repetition transmissions and a slot interval between the two repetition transmissions, as shown in FIG. 6D.

The maximum number of non-overlapping extended SLIVs in this slot is 1, which may be extended SLIV 1 or extended SLIV 2. At most one PDSCH can be received in this slot.

Figure 6E:
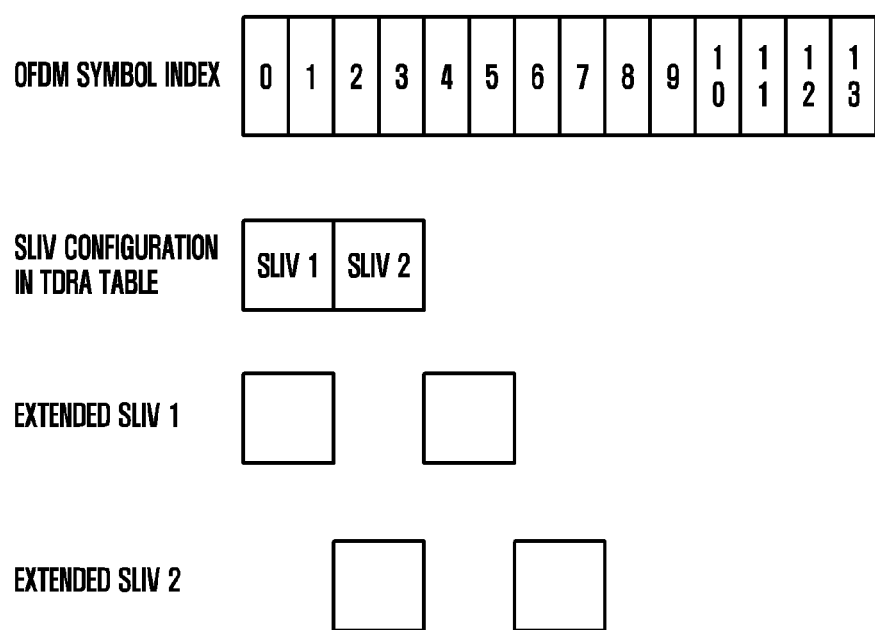
FIG. 6E illustrates an example of time domain resource allocation according to an embodiment of the disclosure.

Alternatively, the extended SLIV may also be defined as including only symbols occupied by two repetition transmissions, but not including a slot interval between the two repetition transmissions, as shown in FIG. 6E.

The maximum number of non-overlapping extended SLIVs in this slot is 2, which may be extended SLIV 1 and extended SLIV 2. At most two PDSCHs can be received in this slot.

A semi-static HARQ-ACK codebook for a PUCCH transmission in an uplink time unit may also be determined by an extended SLIV in a downlink slot corresponding to the set of all K1 for the PUCCH transmission on the uplink time unit.

In some implementations, one or more or all of the DCI formats may be configured with the same $\overline{K}$. In some implementations, a certain DCI format may be configured with $\overline{K}$ used by this DCI format when scheduling PDSCH.

The semi-static HARQ-ACK codebook in this method can solve the problem that PDSCH repeatedly transmitted in a slot has no feedback bit in the HARQ-ACK codebook, and can reduce the size of the semi-static HARQ-ACK codebook, improve the reliability of the HARQ-ACK codebook, reduce the number of UCI bits, and improve the system spectrum efficiency. Mode 1 can ensure that all possible PDSCHs can have corresponding bits in the HARQ-ACK codebook, and improve the reliability of the HARQ-ACK codebook. Mode 2 can reduce the number of bits in the HARQ-ACK codebook, reduce the uplink transmission resources, improve the reliability of the HARQ-ACK codebook, and improve the system spectrum efficiency.

If a PDSCH HARQ-ACK codebook configuration parameter (e.g., the parameter of pdsch-HARQ-ACK-Codebook) is configured to be semi-static (e.g., semi-static), the UE generates a HARQ-ACK codebook according to a rule for a semi-static HARQ-ACK codebook (e.g., Type-1 HARQ-ACK codebook in 3GPP TS 38.213). When a PDSCH may be scheduled by different TDRA tables, a current method is to take a union of all TDRA tables, which will cause many redundant bits in the HARQ-ACK codebook. An improved method is that it may be specified by protocols or configured by higher layer signaling that the UE generates a semi-static HARQ-ACK codebook according to one or more of the TDRA tables for scheduling a PDSCH. It may also be specified by protocols or configured by higher layer signaling according to different priorities respectively that the UE generates a semi-static HARQ-ACK codebook according to one or more of the TDRA tables for scheduling a PDSCH.

For example, the UE may generate a Type-1 HARQ-ACK codebook according to the 3GPP parameter pdsch-TimeDomainAllocationList.

For another example, the UE may generate a Type-1 HARQ-ACK codebook according to the 3 GPP parameter pdsch-TimeDomainAllocationListForDCI-Format1-2-r16.

For example, the UE may generate a Type-1 HARQ-ACK codebook with the lower priority according to the 3GPP parameter pdsch-TimeDomainAllocationList.

For another example, the UE may generate a Type-1 HARQ-ACK codebook with the higher priority according to the 3GPP parameter pdsch-TimeDomainAllocationListForDCI-Format1-2-r16.

The UE does not expect to receive a PDSCH for which there is no feedback bit in a HARQ-ACK codebook.

The method reduces the bits of the Type-1 HARQ-ACK codebook, improves the system spectrum efficiency, improves the reliability of the HARQ-ACK codebook, and reduces the implementation complexity of a UE.

If a PDSCH HARQ-ACK codebook configuration parameter (e.g., the parameter of pdsch-HARQ-ACK-Codebook) is configured to be semi-static (e.g., semi-static), the UE generates a HARQ-ACK codebook according to a rule for a semi-static HARQ-ACK codebook (e.g., Type-1 HARQ-ACK codebook in 3GPP TS 38.213). For example, a HARQ-ACK codebook in a PUCCH in an uplink time unit may be determined by a possible PDSCH for which HARQ-ACK may be transmitted in this uplink time unit. For example, the uplink time unit of the PUCCH may be a sub-slot. When the uplink time unit of the PUCCH is a sub-slot, a case where one uplink sub-slot overlaps with one or more downlink slots may occur.

Figure 7:
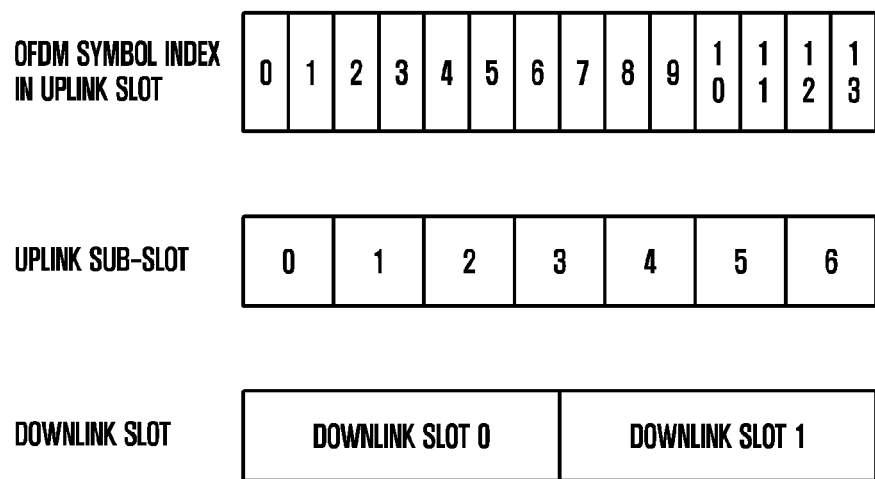
FIG. 7 illustrates an example of downlink slot and uplink sub-slot configuration according to an embodiment of the disclosure.

As shown in FIG. 7, a sub-carrier spacing (SCS) for a downlink slot is 30 kHz, and an SCS for an uplink slot is 15 kHz. An uplink sub-slot includes 2 symbols. Uplink sub-slots 0, 1 and 2 overlap with downlink slot 0 in time domain. Uplink sub-slot 3 overlaps with downlink slots 0 and 1 in time domain.

To solve this problem, a set $M_{A,c}$ of occasions for candidate PDSCH receptions in a semi-static HARQ-ACK codebook may be determined as follows.

Step 1: for slot/sub-slot n, determining a corresponding set of K1 for HARQ-ACK for PDSCH(s) which can be fed back in the slot/sub-slot.

Step 2: for each slot/sub-slot n-k, determining a set of Q of downlink slots overlapping with it in time domain, where k belongs to the set of K1.

Step 3: for each downlink slot in the set Q of each slot/sub-slot n-k, determining a set of valid TDRA configurations in a TDRA table according to a semi-static uplink and downlink configuration, for example, determining the set of valid TDRA configurations according to a manner for a Type-1 HARQ-ACK codebook in 3GPP TS 38.213 Rel-15, where k belongs to the set of K1.

Step 4: for each downlink slot in the set Q of each slot/sub-slot n-k, determining non-overlapping occasions for candidate PDSCH receptions in the set of valid TDRA configurations, for example, according to a manner for a Type-1 HARQ-ACK codebook in 3GPP TS 38.213 Rel-15, where k belongs to the set of K1.

It should be noted that the set of valid TDRA configurations in the TDRA table may be a set of TDRA configurations where no semi-static uplink symbol is configured. The set of valid TDRA configurations in the TDRA table may be a set of TDRA configurations where no semi-static uplink symbol is configured, and the end position of a corresponding PDSCH is in slot/sub-slot n-k. The set of valid TDRA configurations in the TDRA table may be a set of TDRA configurations where no semi-static uplink symbol is configured, and the end position of a corresponding PDSCH overlaps with slot/sub-slot n-k.

For example, for the set of $K_1$, the UE determines the set of $M_{A,c}$ corresponding to slot $n_U$ according to the following pseudo code-2.

| Pseudo code-2 |
|---|
| Set j = 0 - index of occasion for candidate PDSCH reception or SPS PDSCH release |
| Set B = Ø |
| Set $M_{A,c}$ = Ø |
| Set $\mathcal{C}(K_1)$ to the cardinality of set $K_1$ |
| Set k =0 - k is index of slot timing value in $K_{1,k}$, where the elements in set $K_1$ for serving cell c are arranged in descending order |
| while k < $\mathcal{C}(K_1)$ |
|     if mod ($n_u$ - $K_{1,k}$ + 1,max ($2^{\mu_{UL}-\mu_{DL}}$ ,1))= 0 or the UE is configured with a sub-slot (for example, the UE is configured with the 3GPP parameter of subslotLengthForPUCCH-r16) |
|         Set $n_D$ = 0 - index of a DL slot overlapping with an UL slot, for example, UL slot $n_u$ - $K_{1,k}$ |
|         while $n_D$ < N , where N is a number of DL slots overlapping with UL slot $n_u$ - $K_{1,k}$ |
|             Set R to the set of rows, for example, the set of rows of a TDRA table configuration |
|             Set $\mathcal{C}(R)$ to the cardinality of R |
|             Set r = 0 - index of row in set R |
|             if slot $n_u$ starts at a same time as or after a slot for an active DL BWP (Band Width Part) change on serving cell c or an active UL BWP change on the PCell and slot $n_0$ + $n_D$ is before the slot for the active DL BWP change on serving cell c or the active UL BWP change on the PCell, where slot $n_0$ is a DL slot with a smallest index among DL slots overlapping with UL slot $n_u$ - $K_{1,k}$ |
|                 $n_D$ = $n_D$ + 1; |
|             else |
|                 while r < $\mathcal{C}(R)$ |
|                     if the UE is configured with tdd-UL-DL-ConfigurationCommon, or tdd-UL-DL-ConfigurationDedicated and, for each slot from slot $n_0$ + $n_D$ - $N_{PDSCH}^{repeat,max}$ + 1 to slot $n_0$ + $n_D$, at least one symbol of the PDSCH time resource derived by row r is configured as UL where $K_{1,k}$ is the k-th slot timing value in set $K_1$ , where slot no is a DL slot with a smallest index among DL slots overlapping with UL slot $n_u$ - $K_{1,k}$, |
|                       R = R\r ; |
|                   else |
|                       r = r + 1; |
|                   end if |
|                 end while |
|                 if the UE does not indicate a capability to receive more than one unicast PDSCH per slot and R ≠ Ø , |
|                     $M_{A,c}$ = $M_{A,c}$ ∪ j ; |
|                     j = j + 1; |
|                 else |
|                     Set $\mathcal{C}(R)$ to the cardinality of R |
|                     Set m to the smallest last OFDM symbol index, as determined by the SLIV, among all rows of R |
|                     while R ≠ Ø |
|                       Set r = 0 |
|                       while r < $\mathcal{C}(R)$ |
|                         if S ≤ m for start OFDM symbol index S for row r |
|                             $b_{r,k,n_D}$ = j ; - index of occasion for candidate PDSCH reception or SPS PDSCH release associated with row r |
|                             R = R\r ; |
|                             B = B ∪ $b_{r,k,n_D}$ ; |
|                         else |
|                             r = r + 1; |
|                         end if |
|                     end while |
|                     $M_{A,c}$ = $_{A,c}$ ∪ j; |
|                     j = j + 1 ; |
|                     Set m to the smallest last OFDM symbol index among all rows of R; |
|                 end while |
|               end if |

For example, for the set of $K_1$, the UE determines the set of $M_{A,c}$ corresponding to slot $n_U$ according to the following pseudo code-3.

---
Pseudo code-3
---

```
Set j = 0 - index of occasion for candidate PDSCH reception or SPS PDSCH release
Set B = Ø
Set M_{A,c} = Ø
Set 𝒞(K_1) to the cardinality of set K_1
Set k = 0 - k is index of slot timing value in K_{1,k}, where the elements in set K_1 for serving
cell c are arranged in descending order
while k < 𝒞(K_1)
    if mod (n_u - K_{1,k} + 1, max(2^{μUL-μDL}, 1)) = 0 or the UE is configured with a sub-slot (for
      example, the UE is configured with the 3GPP parameter of
      subslotLengthForPUCCH-r16)
    Set n_D = 0 - index of a DL slot overlapping with an UL slot, for example, UL slot
      n_u - K_{1,k}
    while n_D < N, where N is a number of DL slots overlapping with UL slot n_u -
      K_{1,k}
        Set R to the set of rows, for example, the set of rows of a TDRA table
          configuration
        Set 𝒞(R) to the cardinality of R
        Set r = 0 - index of row in set R
        if slot n_u starts at a same time as or after a slot for an active DL BWP (Band
          Width Part) change on serving cell c or an active UL BWP change on the
          PCell and slot n_0 + n_D is before the slot for the active DL BWP change
          on serving cell c or the active UL BWP change on the PCell, where slot n_0
          is a DL slot with a smallest index among DL slots overlapping with UL
          slot n_u - K_{1,k},
          n_D = n_D + 1;
        else
          while r < 𝒞(R)
              if the UE is configured with tdd-UL-DL-ConfigurationCommon, or tdd-
                UL-DL-ConfigurationDedicated and, for each slot from slot n_0 +
                n_D - N_{PDSCH}^{repeat,max} + 1 to slot n_0 + n_D, at least one symbol of the
                PDSCH time resource derived by row r is configured as UL where
                K_{1,k} is the k-th slot timing value in set K_1, where slot no is a DL
                slot with a smallest index among DL slots overlapping with UL
                slot n_u - K_{1,k}, or, the end position of the PDSCH time resource
                derived by row r is not in UL slot n_u - K_{1,k} (the end position of
                the PDSCH time resource derived by row r does not overlap with
                UL slot n_u - K_{1,k})
                R = R\r ;
              else
                r = r + 1;
              end if
          end while
          if the UE does not indicate a capability to receive more than one unicast
            PDSCH per slot and R ≠ Ø ,
            M_{A,c} = M_{A,c} ∪ j;
            j = j + 1;
          else
            Set 𝒞(R) to the cardinality of R
            Set m to the smallest last OFDM symbol index, as determined by the
              SLIV, among all rows of R
            while R ≠ Ø
                Set r = 0
                while r < 𝒞(R)
                    if S ≤ m for start OFDM symbol index S for row r
                      b_{r,k,n_D} = j ; - index of occasion for candidate PDSCH
                        reception or SPS PDSCH release associated with row
                        r
                      R = R\r ;
                      B = B ∪ b_{r,k,n_D} ;
                    else
                      r = r + 1;
                    end if
                end while
                M_{A,c} = M_{A,c} ∪ j;
                j = j + 1;
```

Pseudo code-3

```
            Set m to the smallest last OFDM symbol index among all rows
                of R;
            end while
        end if
        n_D = n_D + 1;
    end if
    end while
end if
k = k + 1;
end while
```

It should be noted that in the method of the disclosure, sub-slot may be replaced by slot, and slot may also be replaced by sub-slot.

It should be noted that in the pseudo codes (e.g., Pseudo code-3) in the disclosure, "the end position of the PDSCH time resource derived by row r is not in UL slot $n_U$-$K_{1,k}$ (the end position of the PDSCH time resource derived by row r does not overlap with UL slot $n_U$-$K_{1,k}$)" may be replaced by "the end position and/or end symbol of DL slot $n_D$ is not in UL slot $n_U$-$K_{1,k}$ (the end position and/or end symbol of DL slot $n_D$ does not overlap with UL slot $n_U$-$K_{1,k}$)".

The method has low implementation complexity, supports a semi-static HARQ-ACK codebook based on sub-slot, and improves the reliability of the HARQ-ACK codebook.

Alternatively, a set $M_{A,c}$ of occasions for candidate PDSCH receptions in a semi-static HARQ-ACK codebook may be determined as follows.

Step 1: for slot/sub-slot n, determining a corresponding set of K1 for HARQ-ACK for PDSCH(s) which can be fed back in the slot/sub-slot.

Step 2: for all slots/sub-slots n-k, determining a set P of downlink slots overlapping with it in time domain, where k belongs to the set of K1.

Step 3: for each downlink slot in the set P, determining a set of valid TDRA configurations in a TDRA table according to a semi-static uplink and downlink configuration, for example, determining the set of valid TDRA configurations according to a manner for a Type-1 HARQ-ACK codebook in 3GPP TS 38.213 Rel-15.

Step 4: for each downlink slot in the set P, determining occasions for non-overlapping candidate PDSCH receptions in the set of valid TDRA configurations, for example, according to a manner for a Type-1 HARQ-ACK codebook in 3GPP TS 38.213 Rel-15, where k belongs to the set of K1.

It should be noted that the set of valid TDRA configurations in the TDRA table may be a set of TDRA configurations where no semi-static uplink symbol is configured. The set of valid TDRA configurations in the TDRA table may be a set of TDRA configurations where no semi-static uplink symbol is configured, and the end position of a corresponding PDSCH is in slot/sub-slot n-k. The set of valid TDRA configurations in the TDRA table may be a set of TDRA configurations where no semi-static uplink symbol is configured, and the end position of a corresponding PDSCH overlaps with slot/sub-slot n-k.

The method can reduce redundant bits of the semi-static HARQ-ACK codebook, improve spectrum efficiency, improve transmission reliability of the HARQ-ACK codebook, and reduce decoding latency of the HARQ-ACK codebook.

When the UE is configured with PUCCH sub-slots, a case where there is no bit corresponding to SPS PDSCH release in a semi-static HARQ-ACK codebook may occur, which may be solved by the following methods.

It may be specified by protocols that in a semi-static HARQ-ACK codebook (e.g., Type-1 HARQ-ACK codebook in 3GPP TS 38.213), a slot interval between DCI indicating SPS PDSCH release and a PUCCH is a slot interval between an indicated SPS PDSCH or the end symbol of an indicated SPS PDSCH with the lowest number in a slot where the DCI indicating SPS PDSCH release is located and the PUCCH.

It may be specified by protocols that in a semi-static HARQ-ACK codebook (e.g., Type-1 HARQ-ACK codebook in 3GPP TS 38.213), the UE does not expect to receive DCI indicating SPS PDSCH release that has no corresponding bit in a HARQ-ACK codebook.

It may be specified by protocols that in a semi-static HARQ-ACK codebook (e.g., Type-1 HARQ-ACK codebook in 3GPP TS 38.213), the UE does not expect to receive DCI indicating SPS PDSCH release that is in a different uplink slot/sub-slot from the SPS PDSCH indicated by the DCI or the indicated SPS PDSCH with the lowest number.

The method specifies how to feed back the DCI for SPS PDSCH release in a semi-static HARQ-ACK codebook based on a sub-slot, thus ensuring the consistency of understanding of a HARQ-ACK codebook by a UE and a base station and improving the reliability of the HARQ-ACK codebook.

If a PDSCH HARQ-ACK codebook configuration parameter (e.g., the parameter of pdsch-HARQ-ACK-Codebook) is configured to be semi-static (e.g., semi-static), the UE generates a HARQ-ACK codebook according to a rule for a semi-static HARQ-ACK codebook (e.g., Type-1 HARQ-ACK codebook in 3GPP TS 38.213). For example, a HARQ-ACK codebook in a PUCCH in an uplink time unit may be determined by a possible PDSCH for which HARQ-ACK may be transmitted in this uplink time unit. For example, the uplink time unit of the PUCCH may be a sub-slot. When the uplink time unit of the PUCCH is a sub-slot, a case where one uplink sub-slot overlaps with one or more downlink slots may occur.

As shown in FIG. 7, a sub-carrier spacing (SCS) for a downlink slot is 30 kHz, and an SCS for an uplink slot is 15 kHz. An uplink sub-slot includes 2 symbols. Uplink sub-slots 0, 1 and 2 overlap with downlink slot 0 in time domain. Uplink sub-slot 3 overlaps with downlink slots 0 and 1 in time domain.

To solve this problem, a set $M_{A,c}$ of occasions for candidate PDSCH receptions in a semi-static HARQ-ACK codebook may be determined as follows.

Step 1: for uplink slot/sub-slot n, determining a corresponding set of K1 for HARQ-ACK for PDSCH(s) which can be fed back in the uplink slot/sub-slot.

Step 2: for each uplink slot/sub-slot n-k, determining a set Q1 of downlink slots overlapping with it in time domain, where k belongs to the set of K1. If a downlink slot overlaps with multiple uplink slots/sub-slots, the set Q1 corresponding to each uplink slot/sub-slot n-k includes this downlink slot.

Step 3: for each downlink slot in the set Q1 for each uplink slot/sub-slot n-k, determining a set of valid TDRA configurations (TDRA rows) in a TDRA table according to a semi-static uplink and downlink configuration, for example, determining the set of valid TDRA configurations (TDRA rows) according to a manner for a Type-1 HARQ-ACK codebook in 3GPP TS 38.213 Rel-15, where k belongs to the set of K1. Optionally, for each downlink slot in the set Q1 for each uplink slot/sub-slot n-k, if the end symbol/end position of the PDSCH time domain resource corresponding to a TDRA row does not overlap with uplink slot/sub-slot n-k, or the end position of the PDSCH time domain resource corresponding to the TDRA row does not overlap with uplink slot/sub-slot n-k, or the end position of the PDSCH time domain resource corresponding to the TDRA row is not in uplink slot/sub-slot n-k, this TDRA row is deleted from the TDRA table.

Step 4: for each downlink slot in the set Q2 for each uplink slot/sub-slot n-k, determining non-overlapping occasions for candidate PDSCH receptions in the set of valid TDRA configurations (TDRA rows), for example, according to a manner for a Type-1 HARQ-ACK codebook in 3GPP TS 38.213 Rel-15, where k belongs to the set of K1.

It should be noted that the set of valid TDRA configurations (TDRA rows) in the TDRA table may be a set of TDRA configurations (TDRA rows) where no semi-static uplink symbol is configured. The set of valid TDRA configurations (TDRA rows) in the TDRA table may be a set of TDRA configurations (TDRA rows) where no semi-static uplink symbol is configured, and the end position of a corresponding PDSCH is in uplink slot/sub-slot n-k. The set of valid TDRA configurations (TDRA rows) in the TDRA table may be a set of TDRA configurations (TDRA rows) where no semi-static uplink symbol is configured, and the end position of a corresponding PDSCH overlaps with uplink slot/sub-slot n-k.

For example, for the set of $K_1$, the UE determines the set of $M_{A,c}$ corresponding to slot $n_U$ according to the following pseudo code-4.

---

Pseudo code-4

Set j = 0 - index of occasion for candidate PDSCH reception or SPS PDSCH release
Set B = Ø
Set $M_{A,c}$ = Ø
Set $\mathcal{C}(K_1)$ to the cardinality of set $K_1$
Set k = 0 - k is index of slot timing value in $K_{1,k}$, where the elements in set $K_1$ for serving cell c are arranged in descending order
while k < $\mathcal{C}(K_1)$
   if mod ($n_u$ - $K_{1,k}$ + 1, max($2^{\mu_{UL}-\mu_{DL}}$, 1)) = 0 or the UE is configured with a sub-slot (for example, the UE is configured with a 3GPP the parameter of subslotLengthForPUCCH-r16)
     Set $n_D$ = 0 - index of a DL slot overlapping with an UL slot/sub-slot, for example, UL slot/sub-slot $n_u$ - $K_{1,k}$
     while $n_D$ < N, where N is a number of DL slots overlapping with UL slot/sub-slot $n_u$ - $K_{1,k}$
        Set R to the set of rows, for example, the set of rows of a TDRA table configuration
        Set $\mathcal{C}(R)$ to the cardinality of R
        Set r = 0 - index of row in set R
        if slot/sub-slot $n_u$ starts at a same time as or after a slot/time for an active DL BWP (Band Width Part) change on serving cell c or an active UL BWP change on the PCell and slot $n_0$ + $n_D$ is before the slot/time for the active DL BWP change on serving cell c or the active UL BWP change on the PCell, where slot no is a DL slot with a smallest index among DL slots overlapping with UL slot/sub-slot $n_u$ - $K_{1,k}$,
          $n_D$ = $n_D$ + 1;
        else
          while r < $\mathcal{C}(R)$
            if the UE is configured with tdd-UL-DL-ConfigurationCommon, or tdd-UL-DL-ConfigurationDedicated and, for each slot from slot $n_0$ + $n_D$ - $N_{PDSCH}^{repeat,max}$ + 1 to slot $n_0$ + $n_D$, at least one symbol of the PDSCH time resource derived by row r is configured as UL where $K_{1,k}$ is the k-th slot/sub-slot timing value in set $K_1$, where slot $n_0$ is a DL slot with a smallest index among DL slots overlapping with UL slot/sub-slot $n_u$ - $K_{1,k}$ or, the end symbol/end position of the PDSCH time resource derived by row r does not overlap with slot/sub-slot $n_u$ - $K_{1,k}$ (or the end position corresponding to the TDRA does not overlap with slot/sub-slot $n_u$ - $K_{1,k}$, or the end position corresponding to the TDRA is not in UL slot/sub-slot n-k)
              R = R\r ;
            else
              r = r + 1 ;
            end if
          end while
        if the UE does not indicate a capability to receive more than one unicast PDSCH per slot and R ≠ Ø ,
          $M_{A,c}$ = $M_{A,c}$ ∪ j;
          j = j + 1;

-continued

Pseudo code-4

```
        else
            Set 𝒞(R) to the cardinality of R
            Set m to the smallest last OFDM symbol index, as determined by the
                SLIV, among all rows of R
            while R ≠ ∅
                Set r = 0
                while r < 𝒞(R)
                    if S ≤ m for start OFDM symbol index S for row r
                        b_{r,k,n_D} = j ; - index of occasion for candidate PDSCH
                            reception or SPS PDSCH release associated with row
                            r
                        R = R\r ;
                        B = B∪b_{r,k,n_D} ;
                    else
                        r = r + 1;
                    end if
                end while
                M_{A,c} = M_{A,c} ∪ j;
                j = j + 1;
                Set m to the smallest last OFDM symbol index among all rows
                    of R;
            end while
        end if
        n_D = n_D + 1;
    end if
end while
    end if
    k = k + 1;
end while
```

It should be noted that in the pseudo codes (e.g., Pseudo code-4) in the disclosure, "the end symbol/end position of the PDSCH time resource derived by row r does not overlap with slot/sub-slot $n_U-K_{1,k}$ (the end position corresponding to the TDRA does not overlap with slot/sub-slot $n_U-K_{1,k}$, or the end position corresponding to the TDRA is not in UL slot/sub-slot n-k)" may be replaced by "the end position and/or end symbol of DL slot $n_D$ does not overlap with slot/sub-slot $n_U-K_{1,k}$ (the end position and/or end symbol of DL slot $n_D$ is not in UL slot/sub-slot n-k)".

The method is easy to implement, has little change to the existing architecture, and thus can be implemented more conveniently based on the existing architecture. The method can reduce redundant bits of the semi-static HARQ-ACK codebook, improve spectrum efficiency, improve transmission reliability of the HARQ-ACK codebook, and reduce decoding latency of the HARQ-ACK codebook.

If a PDSCH HARQ-ACK codebook configuration parameter (e.g., the parameter of pdsch-HARQ-ACK-Codebook) is configured to be semi-static (e.g., semi-static), the UE generates a HARQ-ACK codebook according to a rule for a semi-static HARQ-ACK codebook (e.g., Type-1 HARQ-ACK codebook in 3GPP TS 38.213). For example, a HARQ-ACK codebook in a PUCCH in an uplink time unit may be determined by a possible PDSCH for which HARQ-ACK may be transmitted in this uplink time unit. For example, the uplink time unit of the PUCCH may be a sub-slot. When the uplink time unit of the PUCCH is a sub-slot, a case where one uplink sub-slot overlaps with one or more downlink slots may occur.

As shown in FIG. 7, a sub-carrier spacing (SCS) for a downlink slot is 30 kHz, and a SCS for an uplink slot is 15 kHz. An uplink sub-slot includes 2 symbols. Uplink sub-slots 0, 1 and 2 overlap with downlink slot 0 in time domain. Uplink sub-slot 3 overlaps with downlink slots 0 and 1 in time domain.

To solve this problem, a set $M_{A,c}$ of occasions for candidate PDSCH receptions in a semi-static HARQ-ACK codebook may be determined as follows.

Step 1: for uplink slot/sub-slot n, determining a corresponding set of K1 for HARQ-ACK for PDSCH(s) which can be fed back in the slot/sub-slot.

Step 2: for each uplink slot/sub-slot n-k, determining a set Q2 of downlink slots overlapping with it in time domain, where k belongs to the set of K1. If a downlink slot overlaps with multiple uplink slots/sub-slots, determining an uplink slot/sub-slot for which set Q2 includes this downlink slot. This uplink slot/sub-slot may be the last uplink slot/sub-slot overlapping with the downlink slot in time domain. This uplink slot/sub-slot may be an uplink slot/sub-slot with the largest number overlapping with the downlink slot in time domain. This uplink slot/sub-slot may be an uplink sub-slot overlapping with the end symbol/end position of the downlink slot.

Step 3: for each downlink slot in the set Q2 for each uplink slot/sub-slot n-k, determining a set of valid TDRA configurations (TDRA rows) in a TDRA table according to a semi-static uplink and downlink configuration, for example, determining the set of valid TDRA configurations (TDRA rows) according to a manner for a Type-1 HARQ-ACK codebook in 3GPP TS 38.213 Rel-15, where k belongs to the set of K1. Optionally, for each downlink slot in the set Q2 for each uplink slot/sub-slot n-k, if the end symbol/end position of the PDSCH time domain resource corresponding to a TDRA row does not overlap with uplink slot/sub-slot n-k, or if the end position of the PDSCH time domain resource corresponding to the TDRA row does not overlap with uplink slot/sub-slot n-k, or if the end position of the PDSCH time domain resource corresponding to the TDRA row is not in uplink slot/sub-slot n-k, this TDRA row is deleted from the TDRA table.

Step 4: for each downlink slot in the set Q2 for each uplink slot/sub-slot n-k, determining non-overlapping occasions for candidate PDSCH receptions in the set of valid TDRA configurations (TDRA rows), for example, according to a manner for a Type-1 HARQ-ACK codebook in 3GPP TS 38.213 Rel-15, where k belongs to the set of K1.

It should be noted that the set of valid TDRA configurations (TDRA rows) in the TDRA table may be a set of TDRA configurations (TDRA rows) where no semi-static uplink symbol is configured. The set of valid TDRA configurations (TDRA rows) in the TDRA table may be a set of TDRA configurations (TDRA rows) where no semi-static uplink symbol is configured, and the end position of a corresponding PDSCH is in uplink slot/sub-slot n-k. The set of valid TDRA configurations (TDRA rows) in the TDRA table may be a set of TDRA configurations (TDRA rows) where no semi-static uplink symbol is configured, and the end position of a corresponding PDSCH overlaps with uplink slot/sub-slot n-k.

For example, for the set of $K_1$, the UE determines the set of $M_{A,c}$ corresponding to slot $n_U$ according to the following pseudo code-5.

---

Pseudo code-5

```
Set i = 0 - index of occasion for candidate PDSCH reception or SPS PDSCH release
Set B = Ø
Set M_{A,c} = Ø
Set 𝒞(K_1) to the cardinality of set K_1
Set k = 0 - k is index of slot timing value in K_{1,k}, where the elements in set K_1 for serving
cell c are arranged in descending order
while k < 𝒞(K_1)
    if mod (n_u - K_{1,k} +1, max(2^{μUL-μDL}, 1)) = 0 or the UE is configured with a sub-slot (for
        example, the UE is configured with the 3GPP parameter of
        subslotLengthForPUCCH-r16)
    Set n_D = 0 - index of a DL slot overlapping with an UL slot/sub-slot, for example,
        UL slot/sub-slot n_u - K_{1,k}
    while n_D < N , where N is a number of DL slots whose end symbols/positions
        are overlapping with UL slot/sub-slot n_u - K_{1,k}
        Set R to the set of rows, for example, the set of rows of a TDRA table
            configuration
        Set 𝒞(R) to the cardinality of R
        Set r = 0 - index of row in set R
        if slot/sub-slot n_u starts at a same time as or after a slot/time for an active DL
            BWP (Band Width Part) change on serving cell c or an active UL BWP
            change on the PCell and slot n_0 + n_D is before the slot/time for the active
            DL BWP change on serving cell c or the active UL BWP change on the
            PCell, where slot no is a DL slot with a smallest index among DL slots
            overlapping with UL slot/sub-slot n_u - K_{1,k}.
            n_D = n_D + 1;
        else
            while r < 𝒞(R)
                if the UE is configured with tdd-UL-DL-ConfigurationCommon, or tdd-
                    UL-DL-ConfigurationDedicated and, for each slot from slot n_0 +
                    n_D - N_{PDSCH}^{repeat,max} + 1 to slot n_0 + n_D, at least one symbol of the
                    PDSCH time resource derived by row r is configured as UL where
                    K_{1,k} is the k-th slot/sub-slot timing value in set K_1 , where slot n_0
                    is a DL slot with a smallest index among DL slots overlapping
                    with UL slot/sub-slot n_u - K_{1,k},
                    R = R\r ;
                else
                    r = r + 1 ;
                end if
            end while
            if the UE does not indicate a capability to receive more than one unicast
                PDSCH per slot and R ≠ Ø ,
                M_{A,c} = M_{A,c} ∪ j ;
                j = j + 1 ;
            else
                Set 𝒞(R) to the cardinality of R
                Set m to the smallest last OFDM symbol index, as determined by the
                    SLIV, among all rows of R
                while R ≠ Ø
                    Set r = 0
                    while r < 𝒞(R)
                        if S ≤ m for start OFDM symbol index S for row r
                            b_{r,k,n_D} = j ; - index of occasion for candidate PDSCH
                                reception or SPS PDSCH release associated with row
                                r
                            R = R\r ;
                            B = B ∪ b_{r,k,n_D} ;
                        else
                            r = r + 1;
                        end if
                    end while
                    M_{A,c} = M_{A,c} ∪ j ;
                    j = j + 1;
```

-continued

| Pseudo code-5 |
|---|
|               Set m to the smallest last OFDM symbol index among all rows<br>                  of R;<br>            end while<br>         end if<br>        $n_D = N_D + 1$;<br>      end if<br>    end while<br>  end if<br>  $k = k + 1$;<br>end while |

For example, for the set of $K_1$, the UE determines the set of $M_{A,c}$ corresponding to slot $n_U$ according to the following pseudo code-6.

| Pseudo code-6 |
|---|
| Set j = 0 - index of occasion for candidate PDSCH reception or SPS PDSCH release<br>Set B = Ø<br>Set $M_{A,c}$ = Ø<br>Set $\mathcal{C}(K_1)$ to the cardinality of set $K_1$<br>Set k = 0 - k is index of slot timing value in $K_{1,k}$, where the elements in set $K_1$ for serving cell c are arranged in descending order<br>while k < $\mathcal{C}(K_1)$<br>  if mod $(n_u - K_{1,k} + 1, \max(2^{\mu_{UL}-\mu_{DL}}, 1))$ = 0 or the UE is configured with a sub-slot (for example, the UE is configured with the 3GPP parameter of subslotLengthForPUCCH-r16)<br>    Set $n_D$ = 0 - index of a DL slot overlapping with an UL slot/sub-slot, for example, UL slot/sub-slot $n_u - K_{1,k}$<br>    while $n_D$ < N, where N is a number of DL slots whose end symbols/positions are overlapping with UL slot/sub-slot $n_u - K_{1,k}$<br>      Set R to the set of rows, for example, the set of rows of a TDRA table configuration<br>      Set $\mathcal{C}(R)$ to the cardinality of R<br>      Set r = 0 - index of row in set R<br>      if slot/sub-slot nu starts at a same time as or after a slot/time for an active DL BWP (Band Width Part) change on serving cell c or an active UL BWP change on the PCell and slot $n_0 + n_D$ is before the slot/time for the active DL BWP change on serving cell c or the active UL BWP change on the PCell, where slot no is a DL slot with a smallest index among DL slots overlapping with UL slot/sub-slot $n_u - K_{1,k}$.<br>        $n_D = n_D + 1$;<br>      else<br>        while r < $\mathcal{C}(R)$<br>          if the UE is configured with tdd-UL-DL-ConfigurationCommon, or tdd-UL-DL-ConfigurationDedicated and, for each slot from slot $n_0 + n_D - N_{PDSCH}^{repeat,max} + 1$ to slot $n_0 + n_D$, at least one symbol of the PDSCH time resource derived by row r is configured as UL where $K_{1,k}$ is the k-th slot/sub-slot timing value in set $K_1$, where slot $n_0$ is a DL slot with a smallest index among DL slots overlapping with UL slot/sub-slot $n_u - K_{1,k}$, or, the end symbol/end position of the PDSCH time resource derived by row r does not overlap with slot/sub-slot $n_u - K_{1,k}$ (or the end position corresponding to the TDRA does not overlap with slot/sub-slot $n_u - K_{1,k}$, or the end position corresponding to the TDRA is not in UL slot/sub-slot n-k)<br>            R = R\r ;<br>          else<br>            r = r + 1 ;<br>          end if<br>        end while<br>        if the UE does not indicate a capability to receive more than one unicast PDSCH per slot and R ≠ Ø ,<br>          $M_{A,c} = M_{A,c} \cup j$ ;<br>          j = j + 1 ;<br>        else<br>          Set $\mathcal{C}(R)$ to the cardinality of R<br>          Set m to the smallest last OFDM symbol index, as determined by the SLIV, among all rows of R |

| Pseudo code-6 |
|---|
| while R ≠ ∅<br>    Set r = 0<br>    while r < $\mathcal{C}$(R)<br>        if S ≤ m for start OFDM symbol index S for row r<br>            $b_{r,k,n_D}$ = j ; - index of occasion for candidate PDSCH<br>                reception or SPS PDSCH release associated with row<br>            r<br>        R = R\r ;<br>        B = B∪$b_{r,k,n_D}$ ;<br>        else<br>            r = r + 1;<br>        end if<br>    end while<br>    $M_{A,c}$ = $M_{A,c}$∪ j ;<br>    j = j + 1;<br>    Set m to the smallest last OFDM symbol index among all rows<br>        of R;<br>    end while<br>  end if<br>  $n_D$ = $n_D$ + 1;<br>  end if<br>  end while<br>  end if<br>  k = k + 1 ;<br>end while |

The method has little change to the existing architecture, and thus can be implemented more conveniently based on the existing architecture. The method can reduce redundant bits of the semi-static HARQ-ACK codebook, improve spectrum efficiency, improve transmission reliability of the HARQ-ACK codebook, and reduce decoding latency of the HARQ-ACK codebook.

If a PDSCH HARQ-ACK codebook configuration parameter (e.g., the parameter of pdsch-HARQ-ACK-Codebook) is configured to be semi-static (e.g., semi-static), the UE generates a HARQ-ACK codebook according to a rule for a semi-static HARQ-ACK codebook (e.g., Type-1 HARQ-ACK codebook in 3GPP TS 38.213). For example, a HARQ-ACK codebook in a PUCCH in an uplink time unit may be determined by a possible PDSCH for which HARQ-ACK may be transmitted in this uplink time unit. For example, the uplink time unit of the PUCCH may be a sub-slot. When the uplink time unit of the PUCCH is a sub-slot, a case where one uplink sub-slot overlaps with one or more downlink slots may occur.

As shown in FIG. 7, a sub-carrier spacing (SCS) for a downlink slot is 30 kHz, and a SCS for an uplink slot is 15 kHz. An uplink sub-slot includes 2 symbols. Uplink sub-slots 0, 1 and 2 overlap with downlink slot 0 in time domain. Uplink sub-slot 3 overlaps with downlink slots 0 and 1 in time domain.

To solve this problem, a set $M_{A,c}$ of occasions for candidate PDSCH receptions in a semi-static HARQ-ACK codebook may be determined as follows.

Step 1: for slot/sub-slot n, determining a corresponding set of K1 for HARQ-ACK for PDSCH(s) which can be fed back in the slot/sub-slot.

Step 2: for each uplink slot/sub-slot n-k, determining a set Q3 of downlink slots overlapping with it in time domain, where k belongs to the set of K1. If a downlink slot overlaps with multiple uplink slots/sub-slots, determining an uplink slot/sub-slot for which the set Q3 includes this downlink slot. It may be determined as follows: if this downlink slot does not overlap with uplink slot/sub-slot n-k', this downlink slot belongs to the set Q3 corresponding to uplink slot/sub-slot n-k, where k' belongs to the set K1 and k' is greater than k. Alternatively, it may be determined as follows: if this downlink slot does not overlap with the previous uplink slot of uplink slot/sub-slot n-k (the previous uplink slot belongs to a HARQ-ACK feedback window of uplink slot n, that is, feedback for PDSCH(s) overlapping with the previous uplink slot may be performed in uplink slot n), this downlink slot belongs to the set Q3 corresponding to uplink slot/sub-slot n-k.

Step 3: for each downlink slot in the set Q3 for each uplink slot/sub-slot n-k, determining a set of valid TDRA configurations (TDRA rows) in a TDRA table according to a semi-static uplink and downlink configuration, for example, determining the set of valid TDRA configurations (TDRA rows) according to a manner for a Type-1 HARQ-ACK codebook in 3GPP TS 38.213 Rel-15, where k belongs to the set of K1. Optionally, for each downlink slot in the set Q3 for each uplink slot/sub-slot n-k, if the end symbol/end position of the PDSCH time domain resource corresponding to a TDRA row does not overlap with uplink slot/sub-slot n-k, or the end position of the PDSCH time domain resource corresponding to the TDRA row does not overlap with uplink slot/sub-slot n-k, or the end position of the PDSCH time domain resource corresponding to the TDRA row is not in uplink slot/sub-slot n-k, this TDRA row is deleted from the TDRA table.

Step 4: for each downlink slot in the set Q3 for each uplink slot/sub-slot n-k, determining occasions for non-overlapping candidate PDSCH receptions in the set of valid TDRA configurations (TDRA rows), for example, according to a manner for a Type-1 HARQ-ACK codebook in 3GPP TS 38.213 Rel-15, where k belongs to the set of K1.

It should be noted that the set of valid TDRA configurations (TDRA rows) in the TDRA table may be a set of TDRA configurations (TDRA rows) where no semi-static uplink symbol is configured. The set of valid TDRA configurations (TDRA rows) in the TDRA table may be a set of TDRA configurations (TDRA rows) where no semi-static uplink symbol is configured, and the end position of a corresponding PDSCH is in uplink slot/sub-slot n-k. The set of valid TDRA configurations (TDRA rows) in the TDRA table may be a set of TDRA configurations (TDRA rows) where no semi-static uplink symbol is configured, and the end position of a corresponding PDSCH overlaps with uplink slot/sub-slot n-k.

For example, for the set of $K_1$, the UE determines the set of $M_{A,c}$ corresponding to slot $n_U$ according to the following pseudo code-7.

| Pseudo code-7 |
| --- |
| Set j = 0 - index of occasion for candidate PDSCH reception or SPS PDSCH release
Set B = Ø
Set $M_{A,c}$ = Ø
Set $\mathcal{C}(K_1)$ to the cardinality of set $K_1$
Set k =0 - k is index of slot timing value in $K_{1,k}$, where the elements in set $K_1$ for serving cell c are arranged in descending order
while k < $\mathcal{C}(K_1)$
   if mod $(n_u - K_{1,k} + 1, \max(2^{\mu_{UL}-\mu_{DL}}, 1))$ = 0 or the UE is configured with a sub-slot (for example, the UE is configured with the 3 GPP parameter of subslotLengthForPUCCH-r16)
      Set $n_D$ =0 - index of a DL slot overlapping with an UL slot/sub-slot, for example, UL slot/sub-slot $n_u - K_{1,k}$
      while $n_D$ < N , where N is a number of DL slots overlapping with UL slot/sub-slot $n_u - K_{1,k}$
         Set R to the set of rows, for example, the set of rows of a TDRA table configuration
         Set $\mathcal{C}(R)$ to the cardinality of R
         Set r = 0 - index of row in set R
         if slot/sub-slot $n_u$ starts at a same time as or after a slot/time for an active DL BWP (Band Width Part) change on serving cell c or an active UL BWP change on the PCell and slot $n_0 + n_D$ is before the slot/time for the active DL BWP change on serving cell c or the active UL BWP change on the PCell, where slot no is a DL slot with a smallest index among DL slots overlapping with UL slot/sub-slot $n_u - K_{1,k}$, or, DL slot $n_0 + n_D$ overlaps with UL slot/sub-slot $n_u - K_{1,k}$ and $K_{1,k-1}$ belongs to the set of K1 (or k is equal to or greater than 0)
            $n_D = n_D + 1$;
         else
            while r < $\mathcal{C}(R)$
               if the UE is configured with tdd-UL-DL-ConfigurationCommon, or tdd-UL-DL-ConfigurationDedicated and, for each slot from slot $n_0 + n_D - N_{PDSCH}^{repeat,max} + 1$ to slot $n_0 + n_D$, at least one symbol of the PDSCH time resource derived by row r is configured as UL where $K_{1,k}$ is the k-th slot/sub-slot timing value in set $K_1$, where slot $n_0$ is a DL slot with a smallest index among DL slots overlapping with UL slot/sub-slot $n_u - K_{1,k}$,
                  R = R\r ;
               else
                   r = r + 1 ;
               end if
            end while
            if the UE does not indicate a capability to receive more than one unicast PDSCH per slot and R ≠ Ø ,
               $M_{A,c} = M_{A,c} \cup j$ ;
               j = j + 1 ;
            else
               Set $\mathcal{C}(R)$ to the cardinality of R
               Set m to the smallest last OFDM symbol index, as determined by the SLIV, among all rows of R
               while R ≠ Ø
                   Set r = 0
                   while r < $\mathcal{C}(R)$
                       if S ≤ m for start OFDM symbol index S for row r
                         $b_{r,k,n_D}$ = j ; - index of occasion for candidate PDSCH reception or SPS PDSCH release associated with row r
                         R = R\r ;
                         B = B $\cup b_{r,k,n_D}$ ;
                     else
                         r = r + 1;
                     end if
                 end while
                 $M_{A,c} = M_{A,c} \cup j$;
                 j = j + 1;
                 Set m to the smallest last OFDM symbol index among all rows of R;
               end while
            end if
         $n_D = n_D + 1$;
      end if
      end while
   end if
   k = k + 1;
end while |

For example, for the set of $K_1$, the UE determines the set of $M_{A,c}$ corresponding to slot $n_U$ according to the following pseudo code-8.

Pseudo code-8

Set j = 0 - index of occasion for candidate PDSCH reception or SPS PDSCH release
Set B = Ø
Set $M_{A,c}$ = Ø
Set $\mathcal{C}(K_1)$ to the cardinality of set $K_1$
Set k =0 - k is index of slot timing value in $K_{1,k}$, where the elements in set $K_1$ for serving cell c are arranged in descending order
while k < $\mathcal{C}(K_1)$
   if mod $(n_u - K_{1,k} +1, \max(2^{\mu UL - \mu DL}, 1))= 0$ or the UE is configured with a sub-slot (for example, the UE is configured with the 3GPP parameter of subslotLengthForPUCCH-r16)
     Set $n_D$ = 0 - index of a DL slot overlapping with an UL slot/sub-slot, for example, UL slot/sub-slot $n_u - K_{1,k}$
     while $n_D$ < N , where N is a number of DL slots whose end symbols/positions are overlapping with UL slot/sub-slot $n_u - K_{1,k}$
       Set R to the set of rows, for example, the set of rows of a TDRA table configuration
       Set $\mathcal{C}(R)$ to the cardinality of R
       Set r = 0 - index of row in set R
       if slot/sub-slot nu starts at a same time as or after a slot/time for an active DL BWP (Band Width Part) change on serving cell c or an active UL BWP change on the PCell and slot $n_0 + n_D$ is before the slot/time for the active DL BWP change on serving cell c or the active UL BWP change on the PCell, where slot no is a DL slot with a smallest index among DL slots overlapping with UL slot/sub-slot $n_u - K_{1,k}$, or, DL slot $n_0 + n_D$ overlaps with UL slot/sub-slot $n_u - K_{1,k}$ and $K_{1,k-1}$ belongs to the set of K1 (or k is equal to or greater than 0)
         $n_D = n_D + 1$;
       else
         while r < $\mathcal{C}(R)$
           if the UE is configured with tdd-UL-DL-ConfigurationCommon, or tdd-UL-DL-ConfigurationDedicated and, for each slot from slot $n_0 + n_D - N_{PDSCH}^{repeat,max} + 1$ to slot $n_0 + n_D$, at least one symbol of the PDSCH time resource derived by row r is configured as UL where $K_{1,k}$ is the k-th slot/sub-slot timing value in set $K_1$, where slot $n_0$ is a DL slot with a smallest index among DL slots overlapping with UL slot/sub-slot $n_u - K_{1,k}$, or, the end symbol/end position of the PDSCH time resource derived by row r does not overlap with slot/sub-slot $n_u - K_{1,k}$ (or the end position corresponding to the TDRA does not overlap with slot/sub-slot $n_u - K_{1,k}$, or the end position corresponding to the TDRA is not in UL slot/sub-slot n-k)
             R = R\r ;
           else
             r = r + 1;
           end if
         end while
         if the UE does not indicate a capability to receive more than one unicast PDSCH per slot and R ≠ Ø ,
           $M_{A,c} = M_{A,c} \cup j$ ;
           j = j + 1 ;
         else
           Set $\mathcal{C}(R)$ to the cardinality of R
           Set m to the smallest last OFDM symbol index, as determined by the SLIV, among all rows of R
           while R ≠ Ø
             Set r = 0
             while r < $\mathcal{C}(R)$
               if S ≤ m for start OFDM symbol index S for row r
                 $b_{r,k,n_D} = j$ ; - index of occasion for candidate PDSCH reception or SPS PDSCH release associated with row r
                 R = R\r ;
                 B = B$\cup b_{r,k,n_D}$ ;
               else
                 r = r + 1;
               end if
             end while
             $M_{A,c} = M_{A,c} \cup j$;
             j = j + 1;

-continued

---
Pseudo code-8
---
```
            Set m to the smallest last OFDM symbol index among all rows
                of R;
            end while
        end if
        n_D = n_D + 1;
      end if
    end while
  end if
  k = k + 1;
end while
```
---

The method has little change to the existing architecture, thus can be implemented more conveniently based on the existing architecture. The method can reduce redundant bits of the semi-static HARQ-ACK codebook, improve spectrum efficiency, improve transmission reliability of the HARQ-ACK codebook, and reduce decoding latency of the HARQ-ACK codebook.

Alternatively, in the pseudo codes-2,3,4,5, 6, 7, and 8 in the disclosure uplink sub-slots may also be indexed, and the index of an uplink sub-slot may be determined by the index of an uplink slot where the uplink sub-slot is located, the index of a sub-slot included in an uplink slot, and the position of this sub-slot in an uplink slot. For example, when the index of an uplink slot is n, and there are M sub-slots in the uplink slot, then the index of sub-slot i in uplink slot n is: n×M+i. A downlink slot corresponding to a certain uplink sub-slot may also be determined by the conversion equation.

For example, in Pseudo code-9, $n_U$ indicates the index of a certain uplink slot. M is the number of sub-slots in an uplink slot, and M is 1 if the length of a sub-slot is not configured.

---
Pseudo code-9
---
Set j = 0-index of occasion for candidate PDSCH reception or SPS PDSCH release
Set B = Ø
Set $M_{A,c}$ = Ø
Set $\mathcal{C}(K_1)$ to the cardinality of set $K_1$
Set k = 0-k is index of slot timing value in $K_{1,k}$, where the elements in set $K_1$ for serving cell c are arranged in descending order
while k < $\mathcal{C}(K_1)$
  if mod $(n_U - K_{1,k} + 1, \max(\lceil M \times 2^{\mu UL - \mu DL} \rceil, 1)) = 0$
    Set $n_D$ = 0-index of a DL slot overlapping with an UL slot/sub-slot, for example,
      UL slot/sub-slot $n_U - K_{1,k}$ while $n_D < \max\left(\left\lceil \dfrac{2^{\mu DL - \mu UL}}{M} \right\rceil, 1\right)$, Set R to the set of rows, for example, the set of rows of a TDRA table configuration
      Set $\mathcal{C}(R)$ to the cardinality of R
      Set r = 0-index of row in set R
      if slot/sub-slot $n_U$ starts at a same time as or after a slot/time for an active DL
        BWP (Band Width Part) change on serving cell c or an active UL BWP change on the PCell and slot
        $\lfloor (n_U - K_{1,k}) \cdot 2^{\mu DL - \mu UL}/M \rfloor + n_D$ is before the slot/time for the active DL BWP change on serving cell c
        or the active UL BWP change on the PCell,
        $n_D = n_D + 1$;
      else
        while r < $\mathcal{C}(R)$
          if the UE is configured with tdd-UL-DL-ConfigurationCommon, or tdd-
            UL-DL-ConfigurationDedicated and, for each slot from slot
            $\lfloor (n_U - K_{1,k}) \cdot 2^{\mu DL - \mu UL}/M \rfloor + n_D - N_{PDSCH}^{repeat,max} + 1$ to slot
            $\lfloor (n_U - K_{1,k}) \cdot 2^{\mu DL - \mu UL}/M \rfloor + n_D$, at least one symbol of the
            PDSCH time resource derived by row r is configured as UL where
            $K_{1,k}$ is the k-th slot/sub-slot timing value in set $K_1$,
            R = R\r;
          else
            r = r + 1;
          end if
        end while
        if the UE does not indicate a capability to receive more than one unicast PDSCH per slot and R ≠ Ø,
          $M_{A,c} = M_{A,c} \cup j$;
          j = j + 1;
        else
          Set $\mathcal{C}(R)$ to the cardinality of R
          Set m to the smallest last OFDM symbol index, as determined by the SLIV, among all rows of R
          while R ≠ Ø
            Set r = 0
            while r < $\mathcal{C}(R)$
              if S ≤ m for start OFDM symbol index S for row r
                $b_{r,k,n_D}$ = j;-index of occasion for candidate PDSCH reception or SPS PDSCH release associated with row r
                R = R\r;
                B = B$\cup b_{r,k,n_D}$;

| Pseudo code-9 |
|---|
| ``` 
                else
                    r = r + 1;
                end if
            end while
            M_{A,c} = M_{A,c} ∪ j;
            j = j + 1;
            Set m to the smallest last OFDM symbol index among all rows of R;
        end while
    end if
    n_D = n_D + 1;
    end if
    end while
end if
k = k + 1;
end while
``` |

It should be noted that in pseudo codes (for example, Pseudo code-9) of the disclosure, the ceiling function "⌈ ⌉" may be replaced by the floor function "⌊ ⌋"; the floor function "⌊ ⌋" may be replaced by the ceiling function "⌈ ⌉".

For example, in Pseudo code-10, $n_U$ indicates the number of a certain uplink slot. M is the number of sub-slots in an uplink slot, and M is 1 if a sub-slot length is not configured.

| Pseudo code-10 |
|---|
| Set j = 0-index of occasion for candidate PDSCH reception or SPS PDSCH release
Set B = ∅
Set $M_{A,c}$ = ∅
Set $\mathcal{C}(K_1)$ to the cardinality of set $K_1$
Set k = 0-k is index of slot timing value in $K_{1,k}$ where the elements in set $K_1$ for serving cell c are arranged in descending order
while k < $\mathcal{C}(K_1)$
  if mod ($n_U - K_{1,k} + 1$, max(M × $2^{\mu_{UL}-\mu_{DL}}$, 1)) = 0
    Set $n_D$ = 0-index of a DL slot overlapping with an UL slot/sub-slot, for example,
      UL slot/sub-slot $n_U - K_{1,k}$
    while $n_D$ < max $\left(\frac{2^{\mu_{DL}-\mu_{UL}}}{M}, 1\right)$,
      Set R to the set of rows, for example, the set of rows of a TDRA table configuration
      Set $\mathcal{C}(R)$ to the cardinality of R
      Set r = 0-index of row in set R
      if slot/sub-slot $n_U$ starts at a same time as or after a slot/time for an active DL
        BWP (Band Width Part) change on serving cell c or an active UL BWP change on the PCell and slot
        $\lfloor (n_U - K_{1,k}) \cdot 2^{\mu_{DL}-\mu_{UL}}/M \rfloor + n_D$ is before the slot/time for the active DL BWP change on serving cell c or
        the active UL BWP change on the PCell,
        $n_D = n_D + 1$;
      else
        while r < $\mathcal{C}(R)$
          if the UE is configured with tdd-UL-DL-ConfigurationCommon, or tdd-
          UL-DL-ConfigurationDedicated and, for each slot from slot
          $\lfloor (n_U - K_{1,k}) \cdot 2^{\mu_{DL}-\mu_{UL}}/M \rfloor + n_D - N_{PDSCH}^{repeat,max} + 1$ to slot
          $\lfloor (n_U - K_{1,k}) \cdot 2^{\mu_{DL}-\mu_{UL}}/M \rfloor + n_D$, at least one symbol of the
          PDSCH time resource derived by row r is configured as UL where
          $K_{1,k}$ is the k-th slot/sub-slot timing value in set $K_1$,
          R = R\r;
        else
          r = r + 1 ;
        end if
      end while
      if the UE does not indicate a capability to receive more than one unicast PDSCH per slot and R ≠ ∅,
        $M_{A,c} = M_{A,c} \cup j$;
        j = j + 1;
      else
        Set $\mathcal{C}(R)$ to the cardinality of R
        Set m to the smallest last OFDM symbol index, as determined by the SLIV, among all rows of R
        while R ≠ ∅
          Set r = 0
          while r < $\mathcal{C}(R)$
            if S ≤ m for start OFDM symbol index S for row r
              $b_{r,k,n_D}$ = j;-index of occasion for candidate PDSCH reception or SPS PDSCH release associated with row r
              R = R\r ;
              B = B∪$b_{r,k,n_D}$; |

Pseudo code-10

```
            else
                r = r + 1;
            end if
        end while
        M_{A,c} = M_{A,c} ∪ j;
        j = j + 1;
            Set m to the smallest last OFDM symbol index among all rows of R;
        end while
    end if
    n_D = n_D + 1;
    end if
  end while
 end if
 k = k + 1;
end while
```

The method has little change to the existing architecture, thus can be implemented more conveniently based on the existing architecture. The method can reduce redundant bits of the semi-static HARQ-ACK codebook, improve spectrum efficiency, improve transmission reliability of the HARQ-ACK codebook, and reduce decoding latency of the HARQ-ACK codebook.

It should be noted that in various embodiments of the disclosure, determining the uplink slot/sub-slot overlapped with the PDSCH according to the time domain position (e.g., end symbol and/or end position of PDSCH) of the PDSCH may be replaced by determining the uplink slot/sub-slot overlapped with the PDSCH according to the downlink slot (e.g., end symbol and/or end position of downlink slot) of the PDSCH. For example, in Step 2 of each embodiment of the disclosure, "determining a set of downlink slots overlapping with it in time domain" can be replaced by "determining a set of downlink slots whose end symbol and/or end position overlap with it in time domain". For example, "the PDSCH time domain resource corresponding to the TDRA row" can be replaced by "the downlink slot where the PDSCH corresponding to the TDRA row is located".

It should be noted that, in the scheme of the disclosure, unless otherwise specified, all kinds of information and/or parameters and/or configurations can be specified by protocols and/or configured by higher layer signaling and/or indicated by DCI dynamically and/or based on UE capability report.

According to an aspect of the disclosure, there is provided a method performed by a user equipment (UE) in a wireless communication system, including receiving downlink data and/or downlink control signaling from a base station; and transmitting uplink data and/or uplink control signaling to the base station based on the downlink data and/or the downlink control signaling received from the base station.

In one embodiment, the receiving of the downlink data and/or the downlink control signaling from the base station includes: receiving first indication information from the base station, wherein the first indication information is used for indicating whether a transmission of a HARQ-ACK codebook including hybrid automatic repeat request (HARQ)-Acknowledgement (ACK) information for semi-persistently scheduled (SPS) physical downlink shared channel (PDSCH) reception can be delayed, and, the transmitting of uplink data and/or uplink control signaling to the base station based on the downlink data and/or the downlink control signaling received from the base station includes: based on the first indication information, delaying the transmission of the HARQ-ACK codebook including the HARQ-ACK information for SPS PDSCH reception(s) until a next available uplink resource.

In one embodiment, the delaying of the transmission of the HARQ-ACK codebook including the HARQ-ACK information for SPS PDSCH reception(s) until the next available uplink resource includes: receiving second indication information transmitted by the base station; based on the second indication information received from the base station, multiplexing HARQ-ACK information for the SPS PDSCH reception(s) with HARQ-ACK information expected to be transmitted in the next available uplink resource to obtain the multiplexed HARQ-ACK codebook, and transmitting the multiplexed HARQ-ACK codebook in the next available uplink resource, wherein, the second indication information is used for indicating whether the HARQ-ACK information for the SPS PDSCH reception(s) can be multiplexed with the HARQ-ACK information expected to be transmitted in the next available uplink resource.

In another embodiment, the multiplexed HARQ-ACK codebook is a semi-static HARQ-ACK codebook, and the bit positions of the HARQ-ACK information for the SPS PDSCH reception(s) in the semi-static HARQ-ACK codebook is determined according to time domain resource(s) for the SPS PDSCH reception(s).

In yet another embodiment, a time position of the next available uplink resource is determined by time position(s) of the SPS PDSCH reception(s) and a first parameter received from the base station, wherein, the first parameter indicates a time interval between the SPS PDSCH reception(s) and actual transmission of the HARQ-ACK information for the SPS PDSCH reception(s).

In yet another embodiment, the first parameter is selected from a set of second parameters for the next available uplink resource, or the first parameter is added into the set of second parameters, wherein the set of second parameters is used for determining time domain position(s) of downlink channel candidate(s) for the semi-static HARQ-ACK codebook, wherein the downlink channel candidate(s) is(are) downlink channel(s) for which HARQ-ACK information is expected to be transmitted in the next available uplink resource.

Further, a HARQ-ACK sub-codebook including the HARQ-ACK information for the SPS PDSCH reception(s) is a compressed HARQ-ACK sub-codebook.

In another embodiment, the compression operation is performed by performing a bundling operation on the HARQ-ACK sub-codebook including the HARQ-ACK information for the SPS PDSCH reception(s).

In another embodiment, a HARQ-ACK sub-codebook including the HARQ-ACK information expected to be transmitted in the next available uplink resource is one of a semi-static HARQ-ACK sub-codebook, a dynamic HARQ-ACK sub-codebook and an enhanced dynamic HARQ-ACK sub-codebook.

In yet another embodiment, at least one of the first indication information and the second indication information is included in downlink control information (DCI) received from the base station.

In yet another embodiment, a time interval between a time position of the HARQ-ACK information for the SPS PDSCH reception(s) and a time when the HARQ-ACK information for the SPS PDSCH reception(s) is actually transmitted is not greater than a first predetermined threshold, or a time interval between a time when the HARQ-ACK information for the SPS PDSCH reception(s) is expected to be transmitted and the time when the HARQ-ACK information for the SPS PDSCH reception(s) is actually transmitted is not greater than a second predetermined threshold, and wherein the first predetermined threshold and/or the second predetermined threshold are included in downlink control information (DCI) received from the base station.

In yet another embodiment, when a time interval between a time position of the HARQ-ACK information for the SPS PDSCH reception(s) and a time when the HARQ-ACK information for the SPS PDSCH reception(s) is actually transmitted is not greater than a first predetermined threshold, the UE does not expect to receive another SPS PDSCH reception for the same HARQ process before the transmission of the HARQ-ACK information for the SPS PDSCH reception(s) ends, and when a time interval between a time when the HARQ-ACK information for the SPS PDSCH reception(s) is expected to be transmitted and the time when the HARQ-ACK information for the SPS PDSCH reception(s) is actually transmitted is not greater than a second predetermined threshold, the UE does not expect to receive another SPS PDSCH reception for the same HARQ process before the transmission of the HARQ-ACK information for the SPS PDSCH reception(s) ends.

In another embodiment, the receiving of the downlink data and/or the downlink control signaling from the base station includes: receiving, from the base station, a time domain resource allocation (TDRA) table and an repetition transmission interval for a physical downlink shared channel (PDSCH), and, the step of transmitting the uplink data and/or the uplink control signaling to the base station based on the downlink data and/or the downlink control signaling received from the base station includes: extending the TDRA table based on the TDRA table and the repetition transmission interval for the PDSCH received from the base station; determining a semi-static hybrid automatic repeat request (HARD)-Acknowledgement (ACK) codebook for the PDSCH based on the extended TDRA table; and transmitting the semi-static HARQ-ACK codebook.

In yet another embodiment, the extended TDRA table is extended to include start and length indicators (SLIVs) for all repetition transmissions of the PDSCH.

Further, the extended TDRA table is extended over lengths of the SLIVs, so as to include all extended SLIVs, wherein the extended SLIVs are determined from SLIVs for multiple repetition transmissions of the PDSCH.

According to an embodiment of the disclosure, a UE may be configured with a PUCCH configuration list parameter (e.g., the parameter of PUCCH-ConfigurationList in 3GPP), which may include two PUCCH configuration parameters (e.g., the parameter of PUCCH-config in 3GPP), including a first PUCCH configuration parameter and a second PUCCH configuration parameter. For example, the first PUCCH configuration parameter may correspond to the second priority (e.g., the smaller priority index (e.g., priority index 0)), which means that the priority of the first PUCCH configuration parameter may be the second priority (e.g., the smaller priority index (e.g., priority index 0)). The second PUCCH configuration parameter may correspond to the first priority (e.g., the larger priority index (e.g., priority index 1)), which means that the priority of the second PUCCH configuration parameter may be the first priority (e.g., the larger priority index (e.g., priority index 1)).

For example, the sub-slot length parameter of each of the first and second PUCCH configuration parameters (e.g., the parameter of sub slotLengthForPUCCH in 3GPP) may be of 7 OFDM symbols, or 6 OFDM symbols, or 2 OFDM symbols. Sub-slot configuration length parameters in different PUCCH configuration parameters may be configured separately. If no sub-slot length parameter is configured in a PUCCH configuration parameter, the scheduling time unit of this PUCCH configuration parameter is one slot by default. If the sub-slot length parameter is configured in a PUCCH configuration parameter, the scheduling time unit of this PUCCH configuration parameter is a number of OFDM symbols of which the number is the configured sub-slot configuration length.

When a PUCCH resource carrying 1-bit HARQ-ACK with the higher priority overlaps with a PUCCH resource carrying 1-bit HARQ-ACK with the lower priority in time domain, the two PUCCHs may be multiplexed in one PUCCH resource. This PUCCH resource may be, for example, the PUCCH resource carrying the HARQ-ACK with the higher priority. For another example, the PRB of this PUCCH resource may be the PUCCH resource carrying the 1-bit HARQ-ACK with the higher priority plus an offset, which is used to indicate an offset between the PUCCH resource carrying the HARQ-ACK with the lower priority and HARQ-ACK with the higher priority and a PRB of a PUCCH carrying the HARQ-ACK with the higher priority. The offset may be configured by higher layer signaling. For example, PUCCH format 0 with the higher priority and PUCCH format 1 with the higher priority may be configured with an offset respectively. PUCCH format 0 with the higher priority and PUCCH format 1 with the higher priority may be configured with the same offset. By configuring the offset, a base station can distinguish whether a UE multiplexes HARQ-ACKs with different priorities when decoding a PUCCH, which can improve the reliability of UCI decoding, reduce unnecessary PDSCH retransmission and improve spectrum efficiency.

If the PUCCH resource is PUCCH format 0, a sequence cyclic prefix corresponding to the multiplexed HARQ-ACK bit may be further defined. Different sequence cyclic prefixes are used to distinguish whether HARQ-ACKs with different priorities are multiplexed, for example, as shown in Table 1. The first bit is used to indicate HARQ-ACK with the higher priority, and the second bit is used to indicate HARQ-ACK with the lower priority.

TABLE 1

| HARQ-ACK value | {0, 0} | {0, 1} | {1, 1} | {1, 0} |
| --- | --- | --- | --- | --- |
| Sequence cyclic prefix | $m_{CS} = 2$ | $m_{CS} = 5$ | $m_{CS} = 8$ | $m_{CS} = 11$ |

Table 1 is different from a cyclic prefix used by 2-bit HARQ-ACK with the same priority. When the UE and the base station have different understandings of a HARQ-ACK codebook, the base station can distinguish whether the UE multiplexes HARQ-ACK with the lower priority and HARQ-ACK with the higher priority through different cyclic prefixes.

Alternatively, different HARQ-ACK information, whether HARQ-ACK is multiplexed, and whether there is a positive SR may be indicated by different sequence cyclic prefixes.

There are 4 possible values for 2-bit HARQ-ACK with the higher priority.

Also, there are 4 possible values for 1-bit HARQ-ACK with the higher priority plus 1-bit HARQ-ACK with the lower priority.

Considering multiplexing with a positive SR, there are 16 combinations in total, but only 12 sequence cyclic prefixes are available for a PRB, and thus the 16 combinations may be grouped, among which 8 combinations may have different sequence cyclic prefixes, and in the other 8 combinations, a sequence cyclic prefix is used for every 2 combinations.

For example, 2-bit HARQ-ACK with the higher priority with a value of {0,0} uses the same sequence cyclic prefix as 1-bit HARQ-ACK with the higher priority plus 1-bit HARQ-ACK with the lower priority with a value of {0,0}. The 2-bit HARQ-ACK with the higher priority with a value of {0,0} multiplexed with a positive SR uses the same sequence cyclic prefix as the 1-bit HARQ-ACK with the higher priority plus 1-bit HARQ-ACK with the lower priority with a value of {0,0} multiplexed with a positive SR. The 2-bit HARQ-ACK with the higher priority with a value of {1,1} uses the same sequence cyclic prefix as the 1-bit HARQ-ACK with the higher priority plus 1-bit HARQ-ACK with the lower priority with a value of {1,1}. The 2-bit HARQ-ACK with the higher priority with a value of {1,1} multiplexed with a positive SR uses the same sequence cyclic prefix as the 1-bit HARQ-ACK with the higher priority plus 1-bit HARQ-ACK with the lower priority with a value of {1,1} multiplexed with a positive SR. The other eight combinations can use different sequence cyclic prefixes.

The method uses different sequence cyclic prefixes to distinguish different HARQ-ACK information and whether there is a positive SR, which can reduce the use of additional PRB and improve the spectrum efficiency of the system.

According to an embodiment of the disclosure, a UE may be configured with a PUCCH configuration list parameter (e.g., the parameter of PUCCH-ConfigurationList in 3GPP), which may include two PUCCH configuration parameters (e.g., the parameter of PUCCH-config in 3GPP), including a first PUCCH configuration parameter and a second PUCCH configuration parameter. For example, the first PUCCH configuration parameter may correspond to the second priority (e.g., the smaller priority index (e.g., priority index 0)), which means that the priority of the first PUCCH configuration parameter may be the second priority (e.g., the smaller priority index (e.g., priority index 0)). The second PUCCH configuration parameter may correspond to the first priority (e.g., the larger priority index (e.g., priority index 1)), which means that the priority of the second PUCCH configuration parameter may be the first priority (e.g., the larger priority index (e.g., priority index 1)).

For example, the sub-slot length parameter of each of the first and second PUCCH configuration parameters (e.g., the parameter of sub slotLengthForPUCCH in 3GPP) may be of 7 OFDM symbols, or 6 OFDM symbols, or 2 OFDM symbols. Sub-slot length parameters in different PUCCH configuration parameters may be configured separately. If no sub-slot length parameter is configured in a PUCCH configuration parameter, the scheduling time unit of this PUCCH configuration parameter is one slot by default. If the sub-slot length parameter is configured in a PUCCH configuration parameter, the scheduling time unit of this PUCCH configuration parameter is a number of OFDM symbols of which the number is the configured sub-slot configuration length.

If a PUCCH carrying HARQ-ACK with the lower priority overlaps with a PUCCH carrying an SR with the higher priority in time domain, a PUCCH resource transmitted by the UE may be determined according to a format of the PUCCH carrying the HARQ-ACK with the lower priority and/or whether the PUCCH carrying the HARQ-ACK with the lower priority and the PUCCH carrying the SR with the higher priority are in a sub-slot (e.g., a sub-slot with the higher priority).

For example, when the format of the PUCCH carrying the HARQ-ACK with the lower priority is PUCCH format 2 and/or PUCCH format 3 and/or PUCCH format 4, if the PUCCH carrying the HARQ-ACK with the lower priority and the PUCCH carrying the SR with the higher priority are in a sub-slot (e.g., a sub-slot with the higher priority), the UE multiplexes the PUCCH carrying the SR with the higher priority and the PUCCH carrying the HARQ-ACK with the lower priority in a PUCCH resource for transmission. For example, this PUCCH resource may be a PUCCH resource carrying the HARQ-ACK with the lower priority; and if the PUCCH carrying the HARQ-ACK with the lower priority and the PUCCH carrying the SR with the higher priority are not in a sub-slot (e.g., a sub-slot with the higher priority), the UE transmits the PUCCH carrying the SR with the higher priority, and does not transmit the PUCCH carrying the HARQ-ACK with the lower priority.

According to the disclosure, a multiplexed PUCCH is limited in a sub-slot with the higher priority, the overlap between the multiplexed PUCCH and PUCCH in other sub-slots with the higher priority in time domain is avoided, and the implementation complexity and the cost of a UE are reduced.

According to another aspect of the disclosure, there is provided a user equipment (UE) in a wireless communication system, including a transceiver configured to transmit and receive signals; and a controller configured to control the transceiver to: receive downlink data and/or downlink control signaling from a base station; and transmit uplink data and/or uplink control signaling to the base station based on the downlink data and/or the downlink control signaling received from the base station.

According to another aspect of the disclosure, there is provided a method performed by a base station in a wireless communication system, including: transmitting downlink data and/or downlink control signaling to a UE; and receiving, from the UE, uplink data and/or uplink control signaling transmitted by the UE based on the downlink data and/or the downlink control signaling received from the base station.

According to another aspect of the disclosure, there is provided a base station in a wireless communication system, including a transceiver configured to transmit and receive signals; and a controller configured to control the transceiver to: transmit downlink data and/or downlink control signaling to a UE; and receive, from the UE, uplink data and/or uplink control signaling transmitted by the UE based on the downlink data and/or the downlink control signaling received from the base station.

Figure 8:
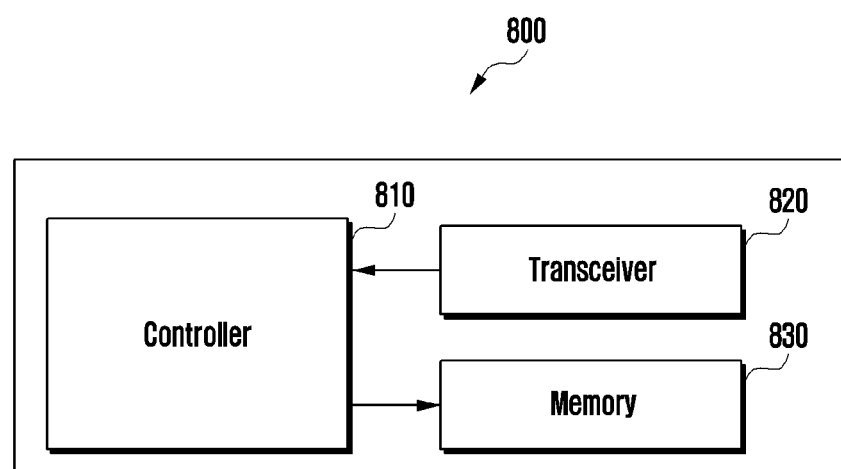
FIG. 8 illustrates a structure of a user equipment (UE) according to an embodiment of the disclosure.

FIG. 8 illustrates a structure of a user equipment (UE) according to embodiments of the disclosure.

Referring to FIG. 8, the UE 800 may include a controller 810, a transceiver 820, and a memory 830. However, all of the illustrated components are not essential. The UE 800 may be implemented by more or less components than those illustrated in FIG. 8. In addition, the controller 810 and the transceiver 820 and the memory 830 may be implemented as a single chip according to another embodiment.

The UE 800 may correspond to the UE, the terminal described above.

The aforementioned components will now be described in detail.

The controller 810 may include one or more processors or other processing devices that control the proposed function, process, and/or method. Operation of the UE 800 may be implemented by the controller 810.

The transceiver 820 may include an RF transmitter for up-converting and amplifying a transmitted signal, and an RF receiver for down-converting a frequency of a received signal. However, according to another embodiment, the transceiver 820 may be implemented by more or less components.

The transceiver 820 may be connected to the controller 810 and transmit and/or receive a signal. The signal may include control information and data. In addition, the transceiver 820 may receive the signal through a wireless channel and output the signal to the controller 810. The transceiver 820 may transmit a signal output from the controller 810 through the wireless channel.

The memory 830 may store the control information or the data included in a signal obtained by the UE 800. The memory 830 may be connected to the controller 820 and store at least one instruction or a protocol or a parameter for the proposed function, process, and/or method. The memory 830 may include read-only memory (ROM) and/or random access memory (RAM) and/or hard disk and/or CD-ROM and/or DVD and/or other storage devices.

Figure 9:
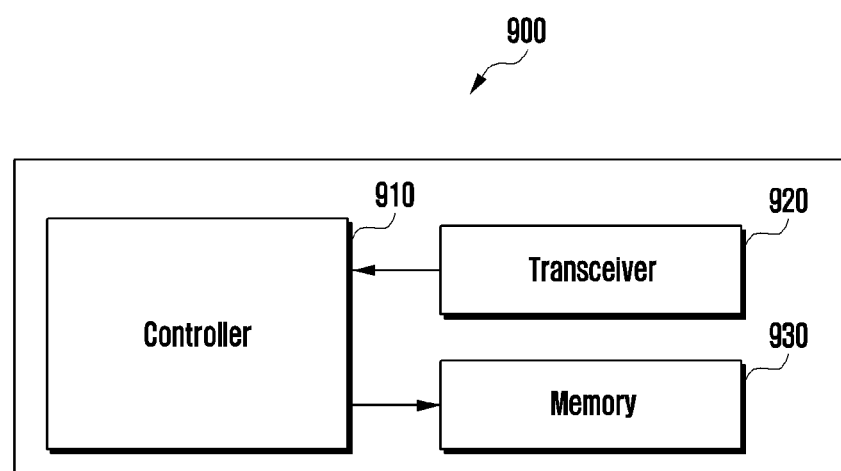
FIG. 9 illustrates a structure of a base station according to an embodiment of the disclosure.

FIG. 9 illustrates a structure of a base station according to embodiments of the disclosure.

Referring to FIG. 9, the base station 900 may include a controller 910, a transceiver 920, and a memory 930. However, all of the illustrated components are not essential. The base station 900 may be implemented by more or less components than those illustrated in FIG. 9. In addition, the controller 910 and the transceiver 920 and the memory 930 may be implemented as a single chip according to another embodiment.

The base station 900 may correspond to the base station described in the disclosure.

The aforementioned components will now be described in detail.

The controller 910 may include one or more processors or other processing devices that control the proposed function, process, and/or method. Operation of the base station 900 may be implemented by the controller 910.

The transceiver 920 may include an RF transmitter for up-converting and amplifying a transmitted signal, and an RF receiver for down-converting a frequency of a received signal. However, according to another embodiment, the transceiver 920 may be implemented by more or less components.

The transceiver 920 may be connected to the controller 910 and transmit and/or receive a signal. The signal may include control information and data. In addition, the transceiver 920 may receive the signal through a wireless channel and output the signal to the controller 910. The transceiver 920 may transmit a signal output from the controller 910 through the wireless channel.

The memory 930 may store the control information or the data included in a signal obtained by the base station 900. The memory 930 may be connected to the controller 910 and store at least one instruction or a protocol or a parameter for the proposed function, process, and/or method. The memory 930 may include read-only memory (ROM) and/or random access memory (RAM) and/or hard disk and/or CD-ROM and/or DVD and/or other storage devices.

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the invention of the disclosure as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Those skilled may implement the described function sets in different ways for each specific application, but such design decisions should not be interpreted as causing a departure from the scope of this application.

The various illustrative logic blocks, modules, and circuits described in this application may be implemented by a general purpose processor, a Digital Signal Processor (DSP), an Application Specific Integrated Circuit (ASIC), a Field Programmable Gate Array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination of both. The software module may reside in a RAM memory, flash memory, ROM memory, EPROM memory, EEPROM memory, register, hard disk, removable disk, or any other form of storage medium known in the art. An exemplary storage medium is coupled to a processor to enable the processor to read and write information from/to the storage medium. In an alternative, the storage medium may be integrated into the processor. The processor and the storage medium may reside in the ASIC. The ASIC may reside in the user terminal. In an alternative, the processor and the storage medium may reside in the user terminal as discrete components.

In one or more exemplary designs, the functions may be implemented in hardware, software, firmware, or any combination thereof. If implemented in software, each function may be stored as one or more instructions or codes on a computer-readable medium or transferred by it. Computer-readable media include both computer storage media and communication media, the latter including any media that facilitates the transfer of computer programs from one place to another. A storage medium may be any available medium that can be accessed by a general purpose or special purpose computer.

The above description are only exemplary embodiments of the disclosure, but the protection scope of the disclosure is not limited thereto. Any of those familiar with this technical field can make various changes or substitutions within the technical scope disclosed in the disclosure, and these changes or substitutions should be covered within the protection scope of the disclosure. Therefore, the protection scope of the disclosure shall be subject to the protection scope of the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a communication system, the method comprising:
    transmitting, to a base station, capability information indicating a support of semi-persistent scheduling (SPS) hybrid automatic repeat request-acknowledgement (HARQ-ACK) information deferral, wherein the capability information indicates a support of multiplexing and transmission of deferred SPS HARQ-ACK information in a deferred slot;
    receiving, from the base station, a radio resource control (RRC) message including SPS configuration, wherein the SPS configuration includes information for a single value to indicate a maximum number of slots or sub-slots a transmission of HARQ-ACK information for an SPS physical downlink shared channel (PDSCH) can be deferred;
    receiving, from the base station, the SPS PDSCH based on the SPS configuration;
    identifying a physical uplink control channel (PUCCH) resource for first HARQ-ACK information bits associated with the SPS PDSCH, wherein the PUCCH resource is in a first slot, and wherein the PUCCH resource overlaps with a downlink symbol; and
    transmitting, to the base station, HARQ-ACK information bits including second HARQ-ACK information bits associated with the first HARQ-ACK information bits on a physical uplink shared channel (PUSCH) or a PUCCH in a second slot,
    wherein, in case that a PDSCH for a same HARQ process as a HARQ-ACK information bit from the second HARQ-ACK information bits is received prior to transmitting the PUSCH or the PUCCH in the second slot, the HARQ-ACK information bit is not included in the HARQ-ACK information bits transmitted in the second slot.

2. The method of claim 1, wherein, for one or more SPS configurations, the value is configured per SPS configuration.

3. The method of claim 1, wherein the value is larger than or equal to a time difference between the second slot and a slot of the SPS PDSCH reception.

4. The method of claim 1,
    wherein the second HARQ-ACK information bits are appended in a HARQ-ACK codebook generated by the UE.

5. A method performed by a base station in a communication system, the method comprising:
    receiving, from a user equipment (UE), capability information indicating a support of semi-persistent scheduling (SPS) hybrid automatic repeat request-acknowledgement (HARQ-ACK) information deferral, wherein the capability information indicates a support of multiplexing and transmission of deferred SPS HARQ-ACK information in a deferred slot;
    transmitting, to the UE, a radio resource control (RRC) message including SPS configuration, wherein the SPS configuration includes information for a single value to indicate a maximum number of slots or sub-slots a transmission of HARQ-ACK information for an SPS physical downlink shared channel (PDSCH) can be deferred;
    transmitting, to the UE, the SPS PDSCH according to the SPS configuration; and
    receiving, from the UE, HARQ-ACK information bits including second HARQ-ACK information bits associated with first HARQ-ACK information bits on a physical uplink shared channel (PUSCH) or a physical uplink control channel (PUCCH) in a second slot,
    wherein a PUCCH resource for the first HARQ-ACK information bits associated with the SPS PDSCH is in a first slot, and the PUCCH resource overlaps with a downlink symbol, and
    wherein, in case that a PDSCH for a same HARQ process as a HARQ-ACK information bit from the second HARQ-ACK information bits is transmitted prior to receiving the PUSCH or the PUCCH in the second slot, the HARQ-ACK information bit is not included in the HARQ-ACK information bits received in the second slot.

6. The method of claim 5, wherein, for one or more SPS configurations, the value is configured per SPS configuration.

7. The method of claim 5, wherein the value is larger than or equal to a time difference between the second slot and a slot of the SPS PDSCH transmission.

8. The method of claim 5,
    wherein the second HARQ-ACK information bits are appended in a HARQ-ACK codebook generated by the UE.

9. A user equipment (UE) in a communication system, the UE comprising:
    a transceiver; and
    a controller configured to:
        transmit, to a base station, capability information indicating a support of semi-persistent scheduling (SPS) hybrid automatic repeat request-acknowledgement (HARQ-ACK) information deferral, wherein the capability information indicates a support of multiplexing and transmission of deferred SPS HARQ-ACK information in a deferred slot,
        receive, from the base station, a radio resource control (RRC) message including SPS configuration, wherein the SPS configuration includes information for a single value to indicate a maximum number of slots or sub-slots a transmission of HARQ-ACK information for an SPS physical downlink shared channel (PDSCH) can be deferred, receive, from the base station, the SPS PDSCH based on the SPS configuration, identify a physical uplink control channel (PUCCH) resource for first HARQ-ACK information bits associated with the SPS PDSCH, wherein the PUCCH resource is in a first slot, and wherein the PUCCH resource overlaps with a downlink symbol, and transmit, to the base station via the transceiver, HARQ-ACK information bits including second HARQ-ACK information bits associated with the first HARQ-ACK information bits on a physical uplink shared channel (PUSCH) or a PUCCH in a second slot, wherein, in case that a PDSCH for a same HARQ process as a HARQ-ACK information bit from the second HARQ-ACK information bits is received prior to transmitting the PUSCH or the PUCCH in the second slot, the HARQ-ACK information bit is not included in the HARQ-ACK information bits transmitted in the second slot.

10. The UE of claim 9, wherein, for one or more SPS configurations, the value is configured per SPS configuration.

11. The UE of claim 9, wherein the value is larger than or equal to a time difference between the second slot and a slot of the SPS PDSCH reception.

12. The UE of claim 9,
wherein the second HARQ-ACK information bits are appended in a HARQ-ACK codebook generated by the UE.

13. A base station in a communication system, the base station comprising:
a transceiver; and
a controller configured to:
receive, from a user equipment (UE), capability information indicating a support of semi-persistent scheduling (SPS) hybrid automatic repeat request-acknowledgement (HARQ-ACK) information deferral, wherein the capability information indicates a support of multiplexing and transmission of deferred SPS HARQ-ACK information in a deferred slot, transmit, to the UE, a radio resource control (RRC) message including semi-persistent scheduling (SPS) configuration, wherein the SPS configuration includes information for a single value to indicate a maximum number of slots or sub-slots a transmission of hybrid automatic repeat request-acknowledgement (HARQ-ACK) information for an SPS physical downlink shared channel (PDSCH) can be deferred, transmit, to the UE, the SPS PDSCH according to the SPS configuration, and receive, from the UE, HARQ-ACK information bits including second HARQ-ACK information bits associated with first HARQ-ACK information bits on a physical uplink shared channel (PUSCH) or a physical uplink control channel (PUCCH) in a second slot, wherein a PUCCH resource for the first HARQ-ACK information bits associated with the SPS PDSCH is in a first slot, and the PUCCH resource overlaps with a downlink symbol, and wherein, in case that a PDSCH for a same HARQ process as a HARQ-ACK information bit from the second HARQ-ACK information bits is transmitted prior to receiving the PUSCH or the PUCCH in the second slot, the HARQ-ACK information bit is not included in the HARQ-ACK information bits received in the second slot.

14. The base station of claim 13, wherein, for one or more SPS configurations, the value is configured per SPS configuration.

15. The base station of claim 13, wherein the value is larger than or equal to a time difference between the second slot and a slot of the SPS PDSCH transmission.

16. The base station of claim 13,
wherein the second HARQ-ACK information bits are appended in a HARQ-ACK codebook generated by the UE.

* * * * *